United States Patent
Yonezu

(10) Patent No.: US 11,244,499 B2
(45) Date of Patent: Feb. 8, 2022

(54) INFORMATION PROCESSING APPARATUS, NON-TRANSITORY COMPUTER-READABLE STORAGE MEDIUM STORING INFORMATION PROCESSING PROGRAM, INFORMATION PROCESSING SYSTEM, AND INFORMATION PROCESSING METHOD

(71) Applicant: Nintendo Co., Ltd., Kyoto (JP)

(72) Inventor: Makoto Yonezu, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 48 days.

(21) Appl. No.: 16/675,570

(22) Filed: Nov. 6, 2019

(65) Prior Publication Data

US 2020/0151945 A1 May 14, 2020

(30) Foreign Application Priority Data

Nov. 12, 2018 (JP) .............................. JP2018-212370
Nov. 12, 2018 (JP) .............................. JP2018-212371

(51) Int. Cl.
*G06T 15/80* (2011.01)
*A63F 13/60* (2014.01)
*G06T 15/50* (2011.01)

(52) U.S. Cl.
CPC .............. *G06T 15/80* (2013.01); *A63F 13/60* (2014.09); *G06T 15/503* (2013.01)

(58) Field of Classification Search
CPC ................... G06T 15/80; G06T 15/503; G06T 2219/2021; G06T 19/20; A63F 13/60; A63F 13/52; A63F 13/5252
See application file for complete search history.

(56) References Cited

U.S. PATENT DOCUMENTS

| 5,913,918 A | 6/1999 | Nakano et al. |
| 6,319,129 B1 | 11/2001 | Igarashi et al. |
| 9,607,422 B1 * | 3/2017 | Leedom .............. G06F 3/04845 |

(Continued)

FOREIGN PATENT DOCUMENTS

| JP | 2001-096059 | 4/2001 |
| JP | 2006-314633 | 11/2006 |

(Continued)

OTHER PUBLICATIONS

U.S. Appl. No. 16/675,589 to Nakajima, titled: "Information Processing Apparatus, Non-Transitory Computer-Readable Storage Medium Storing Information Processing Program, Information Processing System, and Information Processing Method", filed on Nov. 6, 2019 (53 pages).

(Continued)

*Primary Examiner* — Jitesh Patel
(74) *Attorney, Agent, or Firm* — Nixon & Vanderhye, P.C.

(57) ABSTRACT

An example information processing apparatus stores part shape data indicating shapes of a plurality of kinds of terrain parts forming a terrain in a virtual space, and part arrangement data indicating an arrangement of the terrain parts in the virtual space. The information processing apparatus displaces each of the vertices of the disposed terrain parts, depending on the position of the vertex in the virtual space. The information processing apparatus renders an image of the virtual space including the terrain formed of the displaced terrain parts.

18 Claims, 17 Drawing Sheets

(56) References Cited

U.S. PATENT DOCUMENTS

| | | | |
|---|---|---|---|
| 2005/0219250 A1* | 10/2005 | Sepulveda | G06T 13/40 345/473 |
| 2006/0258444 A1 | 11/2006 | Nogami et al. | |
| 2007/0038421 A1* | 2/2007 | Hu | G06T 15/04 703/6 |
| 2008/0180443 A1* | 7/2008 | Mihara | H04N 13/275 345/427 |
| 2013/0210524 A1* | 8/2013 | Otani | A63F 13/5258 463/33 |
| 2013/0322702 A1 | 12/2013 | Piemonte et al. | |
| 2013/0328871 A1 | 12/2013 | Piemonte et al. | |
| 2014/0278065 A1 | 9/2014 | Ren | |
| 2017/0148194 A1 | 5/2017 | Takahashi | |

FOREIGN PATENT DOCUMENTS

| | | |
|---|---|---|
| JP | 2009-129167 | 6/2009 |
| JP | 2013-168022 | 8/2013 |
| JP | 2017-097567 | 6/2017 |
| JP | 2018-171136 | 11/2018 |

OTHER PUBLICATIONS

Office Action dated Mar. 4, 2021 in U.S. Appl. No. 16/675,589.
Information Processing Apparatus, Non-Transitory Computer-Readable Storage Medium Storing Information Processing Program, Information Processing System, and Information Processing Method.
Office Action dated Nov. 1, 2021 in Japanese Application No. 2018-212370 and English-language machine translation.
Office Action dated Nov. 1, 2021 in Japanese Application No. 2018-212371 and English-language machine translation.
English-language machine translation of JP2018-171136, Nov. 8, 2018.
English-language machine translation of JP 2009-129167, Jun. 11, 2009.

* cited by examiner

F I G. 3
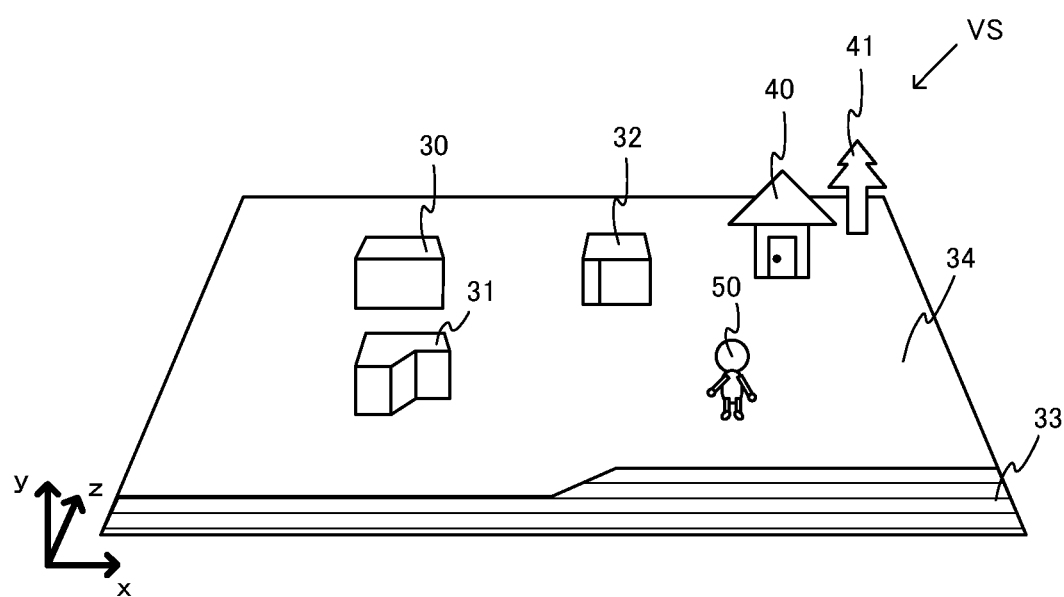

F I G. 9
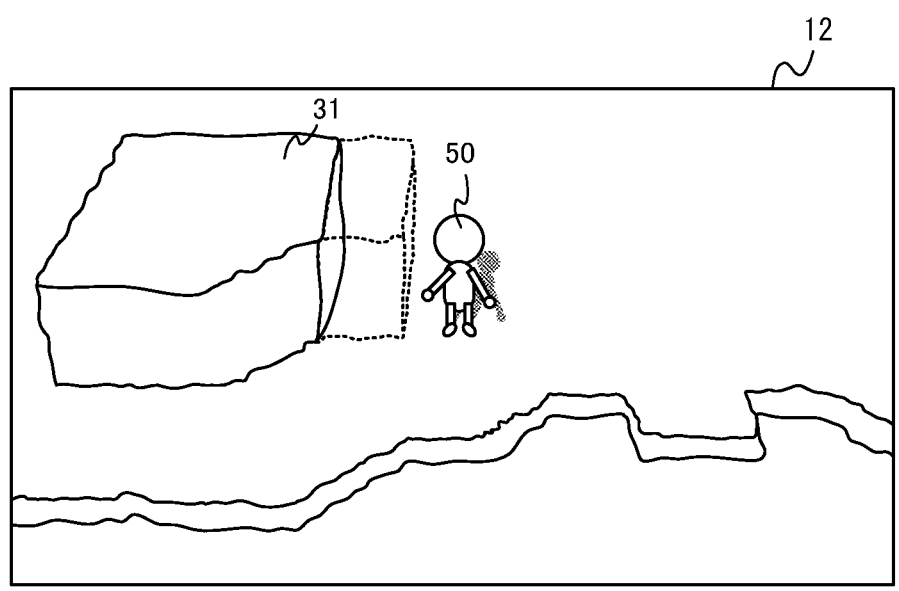

BEFORE ADDITION OF TERRAIN PARTS

AFTER ADDITION OF TERRAIN PARTS

BEFORE SECOND DEFORMATION PROCESS (FIRST DIRECTION)

AFTER SECOND DEFORMATION PROCESS (FIRST DIRECTION)

BEFORE SECOND DEFORMATION PROCESS (SECOND DIRECTION)

AFTER SECOND DEFORMATION PROCESS (SECOND DIRECTION)

BEFORE SECOND DEFORMATION PROCESS (THIRD DIRECTION)

AFTER SECOND DEFORMATION PROCESS (THIRD DIRECTION)

F I G. 2 2
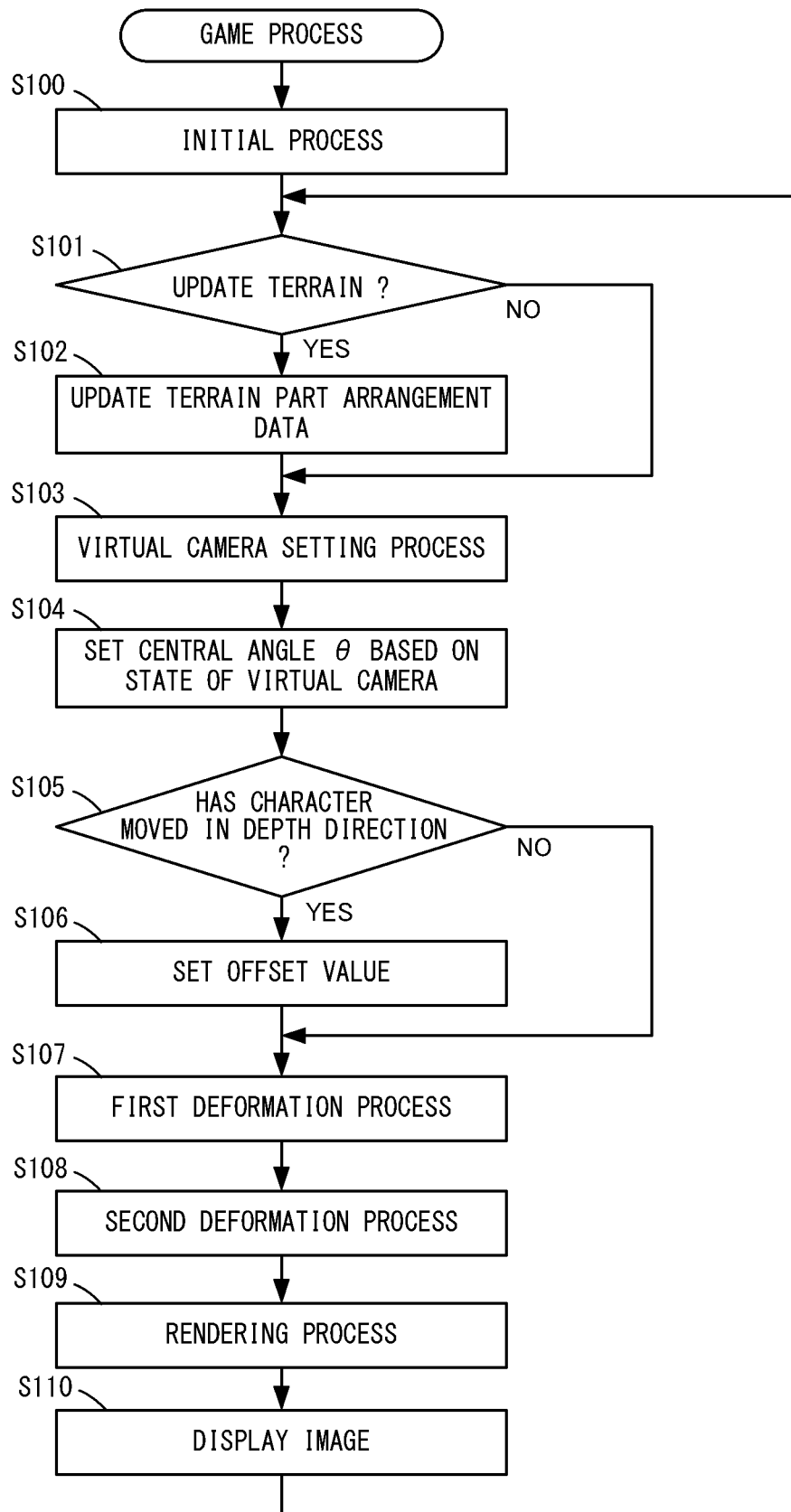

INFORMATION PROCESSING APPARATUS, NON-TRANSITORY COMPUTER-READABLE STORAGE MEDIUM STORING INFORMATION PROCESSING PROGRAM, INFORMATION PROCESSING SYSTEM, AND INFORMATION PROCESSING METHOD

CROSS REFERENCE TO RELATED APPLICATIONS

The disclosures of Japanese Patent Application Nos. 2018-212370 and 2018-212371, both filed Nov. 12, 2018, are incorporated herein by reference.

FIELD

The present disclosure relates to information processing apparatuses, information processing programs, information processing systems, and information processing methods that are capable of generating an image.

BACKGROUND AND SUMMARY

As a related art, for example, there is a game apparatus that provides, in a virtual space, a game field representing a virtual terrain that is previously created by a game creator, and generates and displays an image including the game field based on a virtual camera.

However, in the above related art, concerning the terrain provided in the virtual space, there is room for improvement of development efficiency and more natural appearance.

Therefore, it is an object of this embodiment to provide an information processing apparatus, information processing program, information processing system, and information processing method that can improve development efficiency and provide natural appearance for the terrain provided in the virtual space.

To achieve the above, this non-limiting example embodiment has the following features.

An information processing apparatus according to this embodiment stores part shape data indicating shapes of a plurality of kinds of terrain parts forming a terrain in a virtual space, and part arrangement data indicating an arrangement of the terrain parts in the virtual space, and executes deforming each of the terrain parts relative to the terrain formed by disposing the terrain parts based on the part arrangement data, and rendering the virtual space including the terrain formed of the terrain parts deformed by the deforming, based on a virtual camera.

Thus, a terrain is formed by disposing a plurality of kinds of terrain parts previously stored in the virtual space. Therefore, production cost can be reduced compared to the case where a single terrain is formed as a non-segmented object, resulting in an improvement in development efficiency. In addition, by deforming the terrain parts instead of simply disposing the terrain parts, natural appearance can be provided.

In another feature, in the deforming, the information processing apparatus may deform each of the terrain parts disposed in the virtual space by adding, to vertices of the terrain part, a displacement depending on a coordinate in the virtual space of the vertex.

Thus, each terrain part can be deformed by displacing the vertices of the terrain part disposed in the virtual space, depending on the coordinates thereof in the virtual space. Each vertex is displaced, depending on the coordinates thereof in the virtual space, and therefore, the same kind of terrain parts can be displaced differently if these terrain parts are located at different positions in the virtual space. Therefore, a monotonous terrain can be prevented.

In another feature, the part shape data may contain at least vertex data. The information processing apparatus may include a graphics processor having a vertex shader function. The graphics processor may execute the deforming using the vertex shader function.

Thus, the deforming is performed by the graphics processor using the vertex shader function. Therefore, the deforming can be performed at high speed.

In another feature, in the deforming, the displacement may be determined based on a function representing a predetermined waveform, and the coordinate in the virtual space.

Thus, each vertex is displaced based on a function representing a predetermined waveform. Therefore, each terrain part can be deformed into a natural shape.

In another feature, the part shape data may be set so as to allow vertices in an adjoining portion of adjoining terrain parts in the virtual space to share the same position.

Thus, each terrain part is configured so as to allow the vertices in an adjoining portion of two adjoining terrain parts to have the same position. Therefore, even when each vertex is displaced, depending on the coordinates thereof in the virtual space, misalignment between adjoining terrain parts can be prevented.

In another feature, each of the terrain parts may have a three-dimensional shape having a predetermined shape in a lateral direction and a depth direction of the virtual space. The part arrangement data may indicate an arrangement of a plurality of terrain parts having the predetermined shape in the horizontal and depth directions, where the terrain parts are disposed in the horizontal and depth directions of the virtual space.

Even when a terrain is thus formed by disposing a plurality of terrain parts having the same shape in the horizontal and depth directions of the virtual space, each terrain part is deformed by the deforming, and therefore, natural appearance can be provided while avoiding monotonous appearance.

In another feature, the information processing apparatus may further execute deforming the terrain by converting a vertex position of each of the plurality of terrain parts forming the terrain so as to deform the entire terrain formed by disposing the terrain parts into a curved shape.

Thus, the deforming the entire terrain into a curved shape is further performed. As a result, an image that is easy to see for the user can be generated.

In another feature, the information processing apparatus may execute updating including at least one of addition, removal, and replacement of the terrain part in the virtual space according to a user's instruction, and storing the part arrangement data based on the updating.

Thus, a terrain part can be added to the virtual space, removed, or replaced according to the user's instruction, resulting in the extensibility of the terrain in the virtual space. Even when a terrain part is added, removed, or replaced, natural appearance can be provided by the deforming.

In another feature, in the updating, when the terrain part is added in the virtual space, the added terrain part may be disposed in the virtual space with vertices in an adjoining portion of the added terrain part and another terrain part adjoining the added terrain part sharing the same position.

Thus, when a terrain part is added in the virtual space, the vertices in an adjoining portion of the added terrain part and another terrain part adjoining the added terrain part share the same position. As a result, even when a terrain part is added, two adjoining terrain parts are continuous.

In another embodiment, an information processing program that causes a computer of an information processing apparatus to execute the above processes may be provided. In still another embodiment, an information processing system for executing the above processes may be provided, and an information processing method to be executed in the information processing system may be provided.

According to this embodiment, for a terrain in a virtual space, development efficiency can be improved and natural appearance can be provided.

These and other objects, features, aspects and advantages of the present exemplary embodiment will become more apparent from the following detailed description of the present exemplary embodiment when taken in conjunction with the accompanying drawings.

BRIEF DESCRIPTION OF THE DRAWINGS

FIG. 3 is a diagram showing a non-limiting example virtual space in which a game of this embodiment is played, FIG. 9 is a diagram showing a non-limiting example image that is displayed on the display 12 when a user character 50 performs an action to scrape a portion of a cliff object.

FIG. 22 is a flowchart showing a non-limiting example game process performed in a processor 20 of the body apparatus 2.

DETAILED DESCRIPTION OF NON-LIMITING EXAMPLE EMBODIMENTS (System Configuration)

Figure 1:
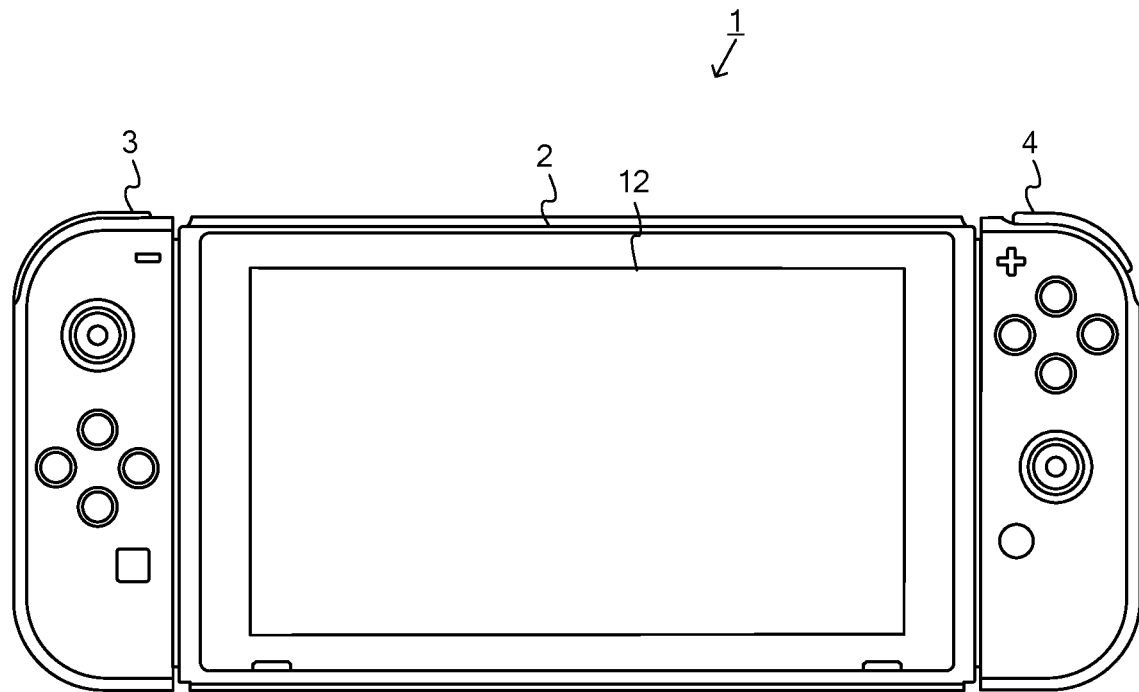
FIG. 1 is a non-limiting example game system 1 in this embodiment.

A game system 1 (non-limiting example information processing system) according to this embodiment will now be described with reference to the accompanying drawings. FIG. 1 is a diagram showing a non-limiting example of the game system 1 of this embodiment. As shown in FIG. 1, the game system 1 includes a body apparatus 2 as a game apparatus, a left controller 3, and a right controller 4. The body apparatus 2 includes a display 12. Note that the left controller 3 and the right controller 4 may be removable from the body apparatus 2.

The left controller 3 is controlled using the user's left hand, and the right controller 4 is controlled using the user's right hand. The left controller 3 and the right controller 4 include a plurality of operation buttons, and an analog stick as a direction input unit.

Figure 2:
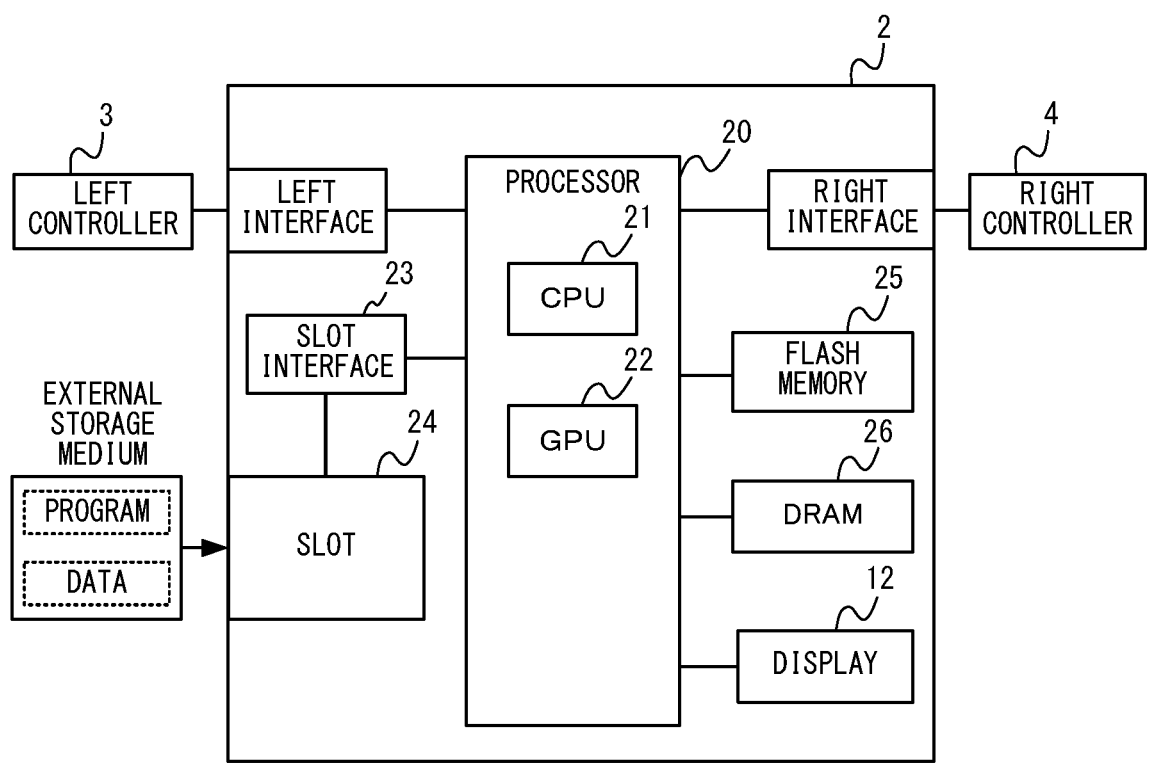
FIG. 2 is a block diagram showing a non-limiting example internal configuration of the game system 1.

FIG. 2 is a block diagram showing a non-limiting example internal configuration of the game system 1. As shown in FIG. 2, the body apparatus 2 includes a processor 20, a slot interface 23, a slot 24, a flash memory 25, and a DRAM 26. The processor 20 includes a central processing unit (CPU) 21 and a graphics processing unit (GPU) 22. The CPU 21 can execute a game program to process operation data from the controllers 3 and 4, execute a game process based on the operation data, and transmit an instruction to the GPU 22 to generate an image. The GPU 22 is a processor for performing image processing. The GPU 22 has a vertex shader function for converting coordinates of vertices of a virtual object. Note that the CPU 21 and the GPU 22 may be mounted on separate chips or may be mounted on a single chip as a system-on-a-chip (SoC).

The processor 20 is coupled to the slot interface 23, the flash memory 25, the DRAM 26, and the display 12. The processor 20 is also coupled through a left interface to the left controller 3, and through a right interface to the right controller 4. An external storage medium is removably inserted into the slot 24. The external storage medium stores a program (a game program described below) and data (part shape data and terrain part arrangement data, etc., described below). Note that the program and data may be previously stored in the flash memory 25, or may be downloaded and stored into the flash memory 25 through a network (e.g., the Internet).

The program and data stored in the external storage medium (or the flash memory 25) are loaded to the DRAM 26 during the start of a game described below. The CPU 21 executes the program to perform a game process described below. The CPU 21 also transmits an instruction to the GPU 22 to display an image on the display 12, and the GPU 22 renders an image according to the instruction, and causes the display 12 to display the image. Note that the body apparatus 2 may be coupled to an external display apparatus different from the display 12, and an image generated by the GPU 22 may be displayed on the external display apparatus.

(Overview of Game and Image Processing of this Embodiment)

Next, a game of this embodiment will be outlined. FIG. 3 is a diagram showing a non-limiting example virtual space in which the game of this embodiment is played. When the game program of this embodiment is executed, a virtual space is defined in the body apparatus 2, and various virtual objects are disposed in the virtual space. A user (player) moves a user character 50 in the virtual space using the left controller 3 and the right controller 4, so that the game proceeds.

As shown in FIG. 3, an xyz orthogonal coordinate system is set in the virtual space. The x-axis is a lateral direction axis of the virtual space, the z-axis is a depth direction axis of the virtual space, and the y-axis is a height direction axis of the virtual space. In the virtual space, as virtual objects, a ground object 34, and a river object 33 that flows through the ground object 34, are disposed. The ground object 34 is a flat reference surface, e.g. a plane parallel to the xz plane. Note that the ground object 34 may be a substantially flat plane that has irregularities or unevenness (a generally flat plane), or may be an exactly flat plane that does not have irregularities or unevenness. In the virtual space, as virtual objects, cliff objects 30-32 are also disposed. The ground object 34, the cliff objects 30-32, and the river object 33 are terrain objects representing the terrain in the virtual space.

In addition, as virtual objects, a house object 40, a tree object 41, and the user character 50 are disposed on the terrain objects. The user plays the game by operating the user character 50. For example, the user character 50 can move on the ground object 34, climb a cliff object, dig a ditch on the ground object 34, scrape a cliff object, and add a new cliff object on the ground object 34 or a cliff object.

The terrain objects (the ground object 34, the river object 33, and the cliff objects 30-32) are formed of a plurality of kinds of terrain parts. In this embodiment, a plurality of kinds of terrain parts are previously prepared, and the ground object 34, the river object 33, and cliff objects are formed by disposing a plurality of kinds of terrain parts in the virtual space.

(Non-Limiting Example Terrain Parts)

Figure 4A:
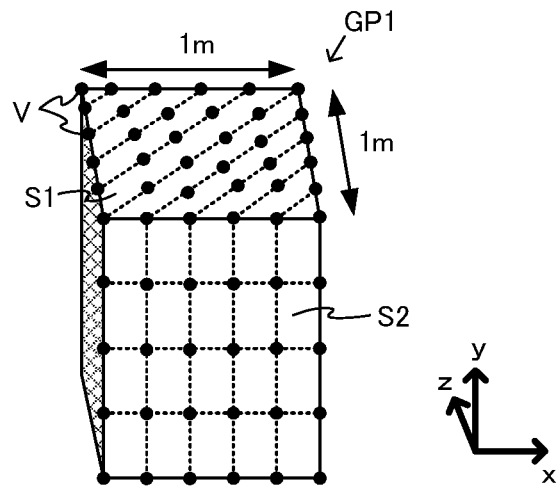
FIG. 4A is a diagram showing a non-limiting example terrain part GP1 that forms a part of a cliff object or ground object.
Figure 4B:
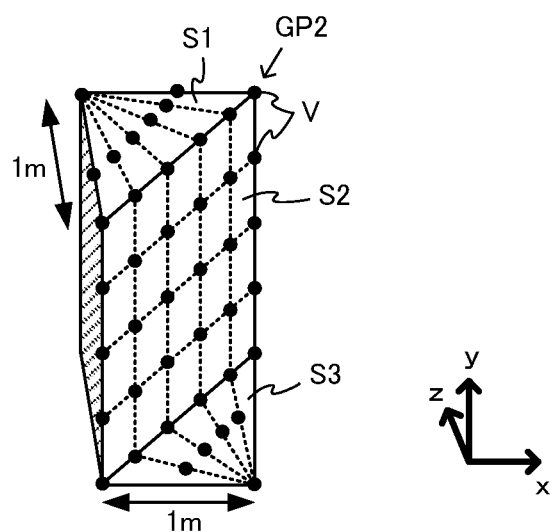
FIG. 4B is a diagram showing a non-limiting example terrain part GP2 that forms a part of a cliff object.
Figure 4C:
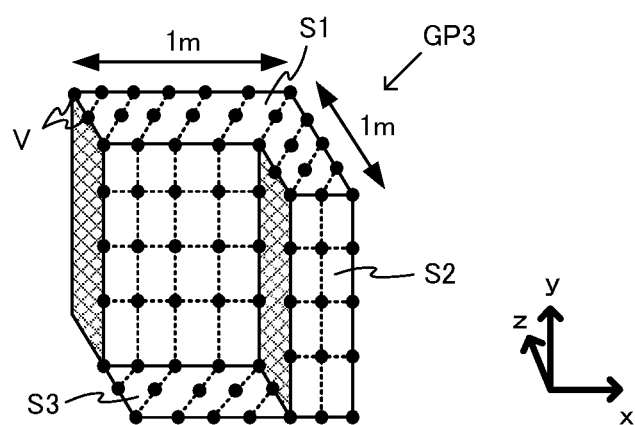
FIG. 4C is a diagram showing a non-limiting example terrain part GP3 that forms a part of a cliff object.

Here, non-limiting example terrain parts will be described. FIG. 4A is a diagram showing a non-limiting example terrain part GP1 that forms a part of a cliff object or ground object. FIG. 4B is a diagram showing a non-limiting example terrain part GP2 that forms a part of a cliff object. FIG. 4C is a diagram showing a non-limiting example terrain part GP3 that forms a part of a cliff object.

As shown in FIG. 4A, the terrain part GP1 includes a plurality of vertices V. The plurality of vertices form the top surface S1, side surfaces S2, and bottom surface of the terrain part GP1. The top surface S1, the side surfaces S2, and the bottom surface form the terrain part GP1. For example, the top surface S1 and bottom surface of the terrain part GP1 are in the shape of a square with a length of, for example, 1 m in the lateral direction (x-axis direction) and depth direction (the z-axis direction) of the virtual space. The side surfaces S2 of the terrain part GP1 are in the shape of a rectangle. Thus, the terrain part GP1 is in the shape of a rectangular parallelepiped with a length of 1 m in the lateral direction (x-axis direction) and depth direction (the z-axis direction) of the virtual space. Part shape data that indicates the shape of the terrain part GP1 is previously stored in the external storage medium. The part shape data indicating the shape of the terrain part GP1 contains data indicating relative positions (e.g., positions relative to a representative vertex) of the vertices V of the terrain part GP1. When the terrain part GP1 is disposed in the virtual space, the coordinate values in the virtual space of each vertex are determined based on the position thereof relative to the representative vertex.

As shown in FIG. 4B, the terrain part GP2 includes a plurality of vertices V. The plurality of vertices V form the top surface S1, side surfaces S2, and bottom surface S3 of the terrain part GP2. The terrain part GP2 forms a part of a cliff object. The terrain part GP2 has a shape different from that of the terrain part GP1. For example, the top surface S1 of the terrain part GP2 is in the shape of an isosceles right triangle with a length of 1 m in the horizontal and depth directions of the virtual space. The top surface S1 and the three side surfaces S2 form a triangular prism. The bottom surface S3 is in the shape of a square with a length of 1 m in the horizontal and depth directions of the virtual space, and a half of the bottom surface S3 forms the bottom surface of the triangular prism. Part shape data indicating the shape of the terrain part GP2 is previously stored in the external storage medium. The part shape data indicating the shape of the terrain part GP2 contains data indicating the relative position of each vertex V of the terrain part GP2.

As shown in FIG. 4C, the terrain part GP3 includes a plurality of vertices V. The plurality of vertices V form the L-shaped top surface S1, side surfaces S2, and bottom surface S3 of the terrain part GP3. The terrain part GP3 forms a part of a cliff object. The terrain part GP3 has a shape different from those of the terrain parts GP1 and GP2. For example, the terrain part GP3 has a shape obtained by cutting away a portion of a rectangular parallelepiped with a length of 1 m in the lateral direction (x-axis direction) and depth direction (the z-axis direction) of the virtual space. The bottom surface S3 of the terrain part GP3 is in the shape of a square with a length of 1 m in the horizontal and depth directions. Part shape data indicating the shape of the terrain part GP3 is previously stored in the external storage medium. The part shape data indicating the shape of the terrain part GP3 contains data indicating the relative position of each vertex V of the terrain part GP3.

As shown in FIGS. 4A-4C, each terrain part is in the shape of a square in the lateral direction (x-axis direction) and depth direction (the z-axis direction) of the virtual space. In other words, each terrain part has a square shape as viewed from directly above (in the y-axis direction).

Although FIGS. 4A-4C show the surfaces (e.g., the top surface and side surfaces) of each terrain part as a flat surface, the surfaces of each terrain part may be an irregular or uneven surface.

In addition to the terrain parts shown in FIGS. 4A-4C, various other terrain parts are previously prepared. For example, a terrain part that forms a part of the river object 33, a terrain part that forms a part of a boundary portion between a river and the ground, a terrain part that forms a part of a sandy road, etc., are prepared. Part shape data indicating these kinds of terrain parts is previously stored in an external storage medium.

(Construction of Terrain Using Terrain Parts)

Figure 5:
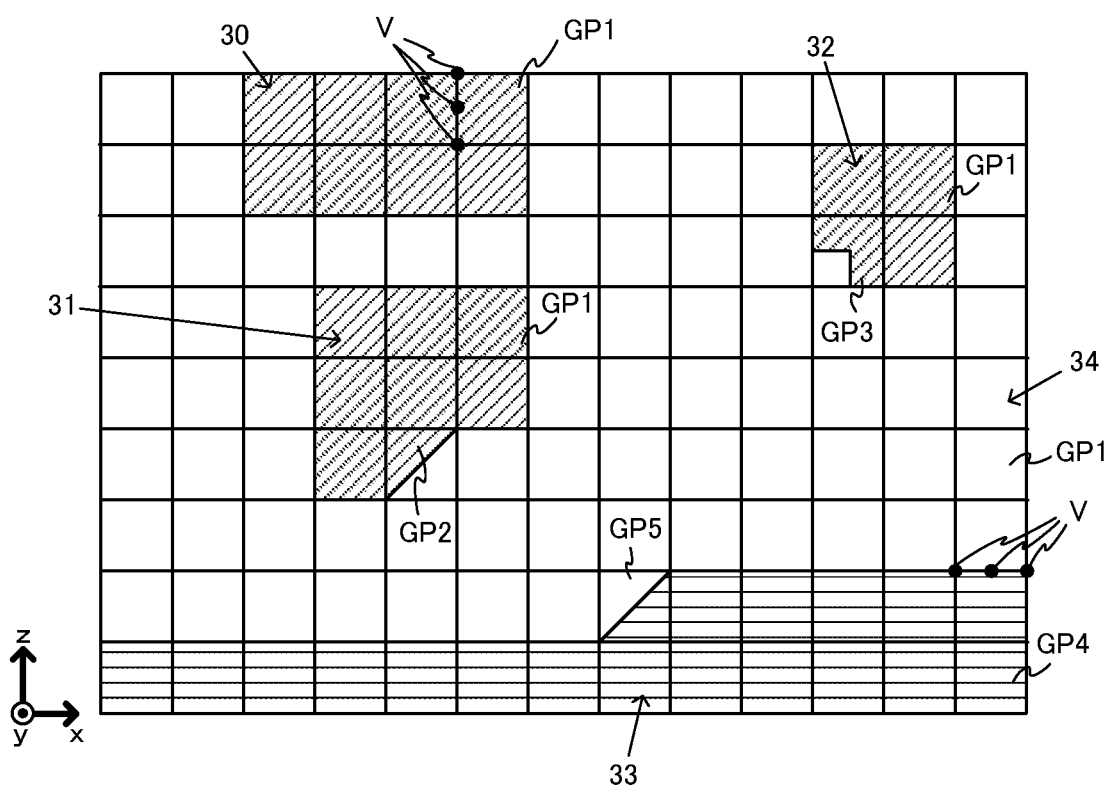
FIG. 5 is a diagram showing a non-limiting example terrain formed by disposing a plurality of kinds of terrain parts in the virtual space.

By disposing the above kinds of terrain parts in the virtual space, a terrain is formed in the virtual space. FIG. 5 is a diagram showing a non-limiting example terrain formed by disposing a plurality of kinds of terrain parts in the virtual space.

FIG. 5 shows the entire terrain in the virtual space as viewed above. As shown in FIG. 5, when the terrain in the virtual space is viewed from above, the terrain looks like a flat plane in which a plurality of squares are disposed in a grid pattern. Each square is the top surface or bottom surface of a terrain part. For example, the cliff object 30 is formed by disposing eight terrain parts GP1. In this case, each terrain part GP1 is previously configured so as to allow the vertices V in an adjoining portion of adjoining terrain parts GP1 to share the same positions. In other words, when a first terrain part GP1 adjoins a second terrain part GP1, a vertex V of the first terrain part GP1 and a vertex V of the second terrain part GP1 in an adjoining portion are located at the same position.

The cliff object 31 is formed of seven terrain parts GP1 and one terrain part GP2. The cliff object 32 is formed of three terrain parts GP1 and one terrain part GP3. Also in this case, each terrain part is previously configured so as to allow the vertices V in an adjoining portion of adjoining terrain parts to share the same positions.

The ground object 34 is formed by disposing a plurality of terrain parts GP1 in a grid pattern extending in the horizontal and depth directions. The river object 33 is formed by disposing a plurality of terrain parts GP4 and one terrain part GP5. The terrain part GP4 is previously prepared for forming a river. The terrain part GP5 includes a boundary portion between a river and the ground. Also in this case, each terrain part is previously configured so as to allow the vertices V in an adjoining portion of adjoining terrain parts to share the same positions. For example, terrain parts are previously configured so that, in the rightmost column of FIG. 5, the vertices V of the second terrain part GP4 from the bottom and the vertices V of the third terrain part GP1 from the bottom in the adjoining portion are located at the same positions.

In this embodiment, terrain part arrangement data indicating an arrangement of a plurality of kinds of terrain parts is previously stored in an external storage medium. By disposing a plurality of terrain parts based on the terrain part arrangement data, a terrain is formed in the virtual space.

Note that the above terrain parts include terrain parts that are allowed to adjoin each other and terrain parts that are not allowed to adjoin each other. For example, a terrain part that forms a part of a "sandy road" and a terrain part that forms a part of a "river" are not allowed to adjoin each other. Specifically, for two terrain parts that are allowed to adjoin each other, the positions of the vertices thereof are previously set so that when the two terrain parts adjoin each other, the vertices thereof in the adjoining portion share the same positions.

In the terrain part arrangement data, the arrangement of terrain parts is determined so that terrain parts that are not allowed to adjoin each other are not located adjacent to each other. In addition, as described below, when a new terrain part is added to the virtual space or when a terrain part disposed in the virtual space is replaced with another terrain part, control is performed in such a manner that terrain parts that are not allowed to adjoin each other are not located adjacent to each other.

(First Deformation Process)

Here, when a terrain is formed by disposing a plurality of previously stored terrain parts based on the terrain part arrangement data, the resultant terrain in the virtual space may be monotonous and unnatural. Therefore, in this embodiment, performed is a first deformation process of deforming (applying a strain to) each terrain part for a terrain formed by disposing a plurality of terrain parts based on the terrain part arrangement data. In this embodiment, the first deformation process is performed each time an image is rendered. By performing the first deformation process, a terrain formed by disposing a plurality of terrain parts is deformed, so that the resultant terrain looks natural.

Figure 6:
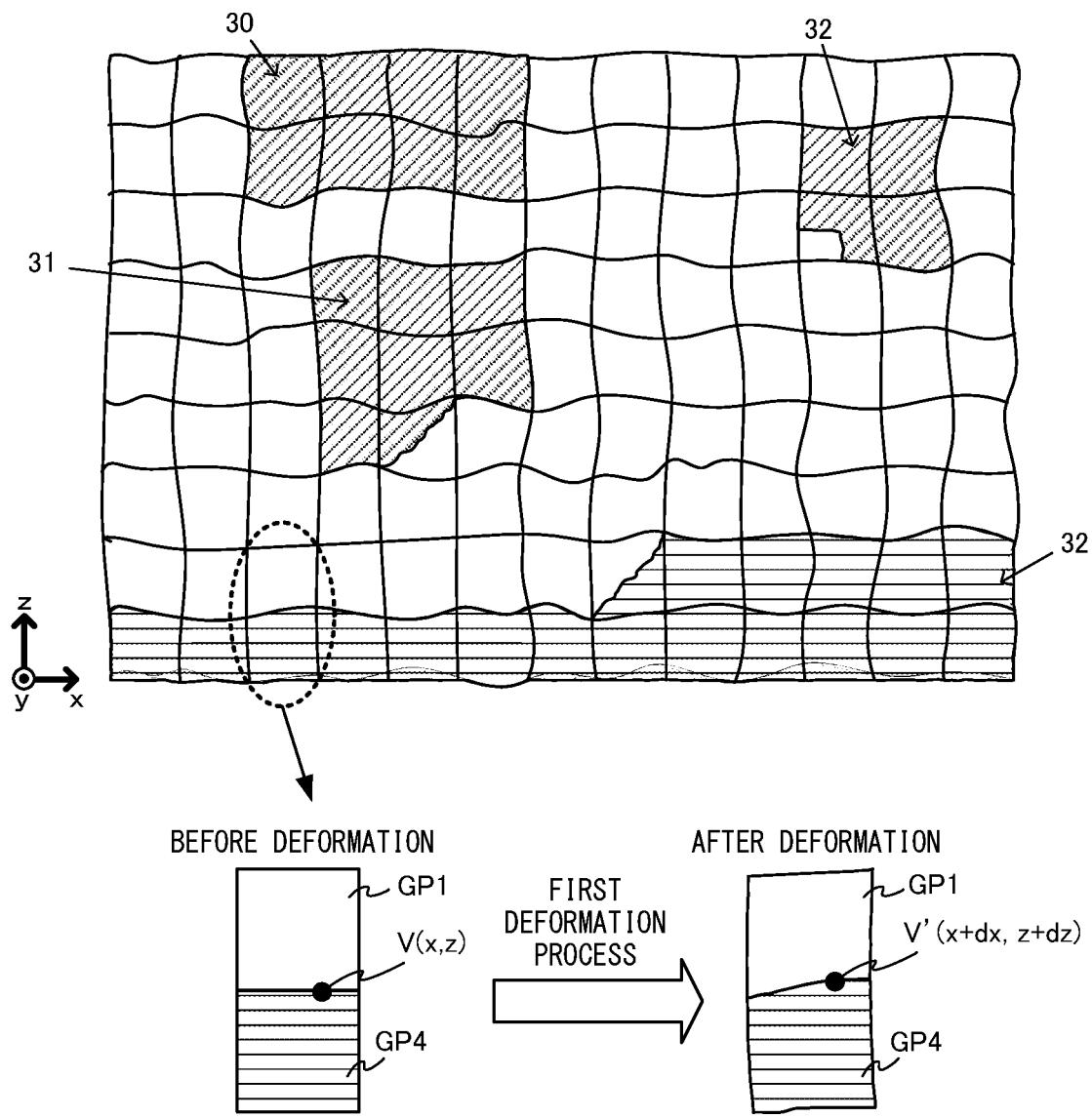
FIG. 6 is a diagram showing a non-limiting example terrain obtained by deforming each terrain part of the terrain of FIG. 5 that is formed by disposing a plurality of terrain parts.

FIG. 6 is a diagram showing a non-limiting example terrain obtained by deforming each terrain part of the terrain of FIG. 5 that is formed by disposing a plurality of terrain parts. As shown in FIG. 6, by deforming a plurality of terrain parts disposed based on the terrain part arrangement data, each terrain part has a curved shape (wavy shape) instead of a linear shape.

Specifically, in the first deformation process, each terrain part disposed in the virtual space based on the terrain part arrangement data is deformed by displacing the vertices of the terrain part, depending on the positions in the virtual space of the vertices. More specifically, each vertex of a terrain part disposed in the virtual space is displaced in the lateral direction (x-axis direction) and depth direction (the z-axis direction) of the virtual space.

A lower portion of FIG. 6 shows a vertex V (x, z) of terrain parts GP1 and GP4 before deformation and a vertex V' (x+dx, z+dz) of the terrain parts GP1 and GP4 after deformation. Here, the displacement amount dx of the x-coordinate value of the vertex V and the displacement amount dz of the z-coordinate value of the vertex V are calculated based on a function having a predetermined waveform. For example, the displacement amounts dx and dz are calculated by the following expressions.

$$dx = \cos(z) \times \cos(z) \times \cos(nz) \times \cos(mz) \times \alpha \quad (1)$$

$$dz = \cos(x) \times \cos(x) \times \cos(nx) \times \cos(mx) \times \alpha \quad (2)$$

In expression 1, "z" is the z-coordinate value of the vertex V in the virtual space before deformation. In expression 2, "x" is the x-coordinate value of the vertex V in the virtual space before deformation. In addition, "n" and "m" are a positive integer, e.g. may be n=3 and m=5. In addition, a is a previously determined coefficient.

By adding, to all vertices of each terrain part, respective displacement amounts calculated by expressions 1 and 2, the vertex V (x, y, z) is displaced to V' (x+dx, y, z+dz). As a result, each terrain part is displaced in the x-axis and z-axis directions. Note that the y-coordinate value of each vertex V remains unchanged irrespective of deformation.

The calculation by expressions 1 and 2 is performed by the vertex shader function of the GPU 22. The GPU 22 changes, according to an instruction from the CPU 21, the position in the virtual space of each vertex located based on the terrain part arrangement data, using expressions 1 and 2. As a result, each terrain part is deformed, so that the entire terrain in the virtual space is deformed. Thereafter, the GPU 22 performs a rendering process so that an image is displayed on the display 12 as shown in FIG. 6. Specifically, each time an image is displayed on the display 12 (for each frame), the GPU 22 displaces the vertices of each terrain part using the vertex shader function to generate an image in which a terrain formed based on the plurality of pieces of part shape data and the terrain part arrangement data is deformed.

As can be seen from expressions 1 and 2, in this embodiment, a function having a predetermined waveform is defined by a combination of a plurality of trigonometric functions having different periods. As a result, different displacement amounts can be added to different vertices, depending on the position of the vertex V in the virtual space. Even the same kind of terrain parts can be deformed into different shapes if the terrain parts are located at different positions. In addition, the displacement amounts dx and dz are determined by a combination of trigonometric functions having different periods, and therefore, it is difficult for the user to be aware of the periods. Therefore, a terrain that looks natural to the user can be created.

Note that expressions 1 and 2 are merely for illustrative purposes, and the displacement amounts dx and dz for a vertex V may be calculated according to other expressions. Alternatively, the displacement amounts dx and dz for a vertex V may be randomly determined, depending on the position in the virtual space of the vertex V.

Figure 7:
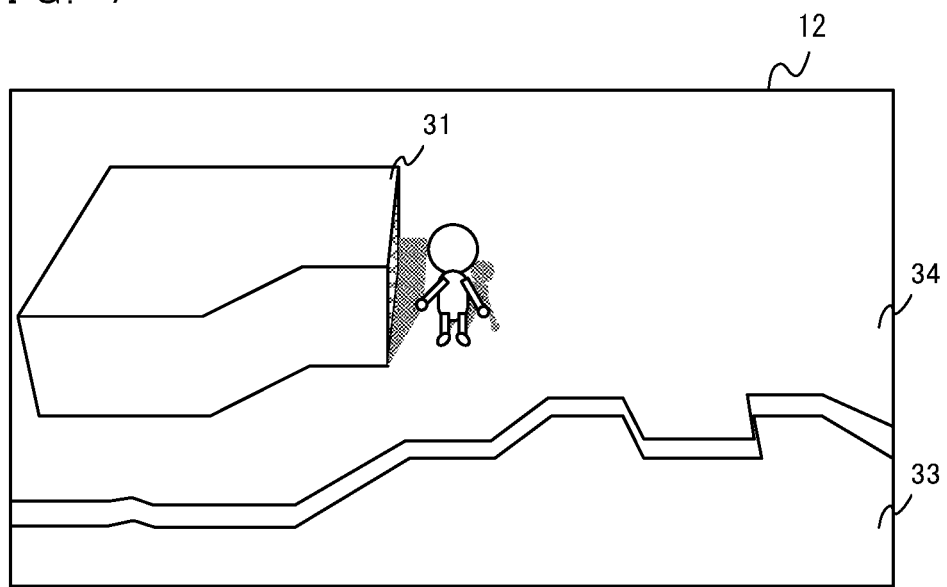
FIG. 7 is a diagram showing a non-limiting example image displayed on a display 12 in the case where a first deformation process is not performed on any terrain part.
Figure 8:
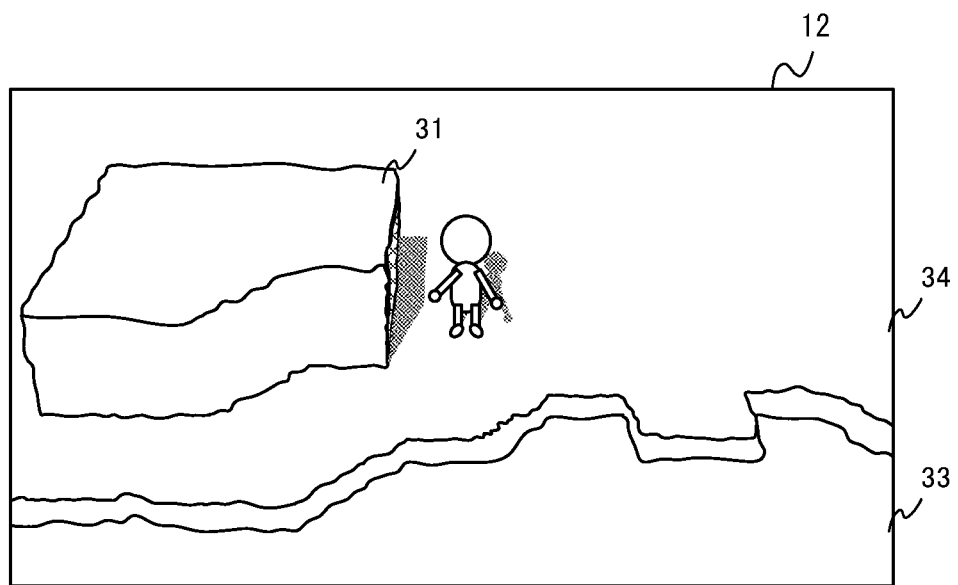
FIG. 8 is a diagram showing a non-limiting example image displayed on the display 12 in the case where the first deformation process is performed on each terrain part.

FIG. 7 is a diagram showing a non-limiting example image displayed on the display 12 in the case where the first deformation process is not performed on any terrain part. FIG. 8 is a diagram showing a non-limiting example image displayed on the display 12 in the case where the first deformation process is performed on each terrain part.

As shown in FIG. 7, in the case where the first deformation process is not performed, the cliff object 31 disposed in the virtual space has generally linear and angular shapes. A boundary between the ground 34 and the river object 33 also has linear and angular shapes. In addition, the entire terrain is formed by a combination of previously prepared terrain parts, and therefore, a plurality of terrain parts having the same shape are disposed in the virtual space, so that the entire terrain is monotonous.

Meanwhile, in the case where the first deformation process is performed on each terrain part, the outer shape of the cliff object 31 has a generally wavy shape and therefore a more natural shape as shown in FIG. 8. This is also true of the boundary between the ground 34 and the river object 33. In addition, the displacement amount of a vertex V of a terrain part varies depending on the position of the vertex V, and therefore, even if the same kinds of terrain parts are disposed in the virtual space, these terrain parts are deformed to have different forms, and therefore, the entire terrain is not monotonous.

(Updating of Terrain by User)

Here, in the game of this embodiment, the user can perform a predetermined operation to cause the user character 50 to, in the virtual space, dig a ditch, scrape a cliff object, and add a new cliff object to the ground and a cliff object. For example, when the user character 50 performs an action to scrape a cliff object, a terrain part(s) is removed from the position where that action has been performed. When the user character 50 performs an action to heap earth on the ground, a terrain part(s) is newly added at the position where that action has been performed. The user's actions to remove, add, and replace a terrain part(s) disposed in the virtual space will now be described.

Figure 10A:
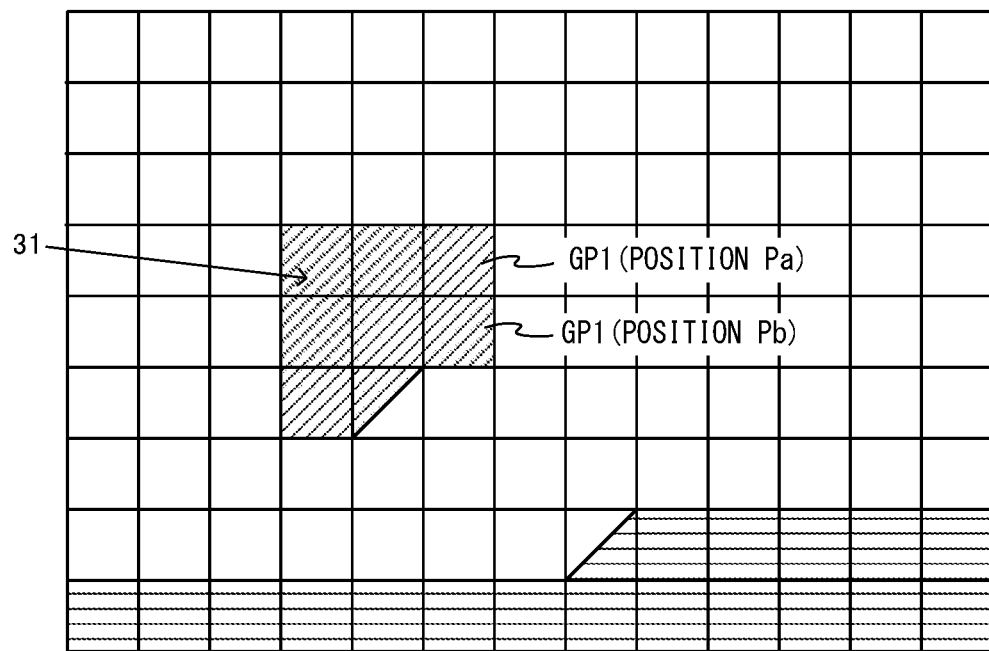
FIG. 10A is a diagram showing the virtual space as viewed from above before the user character 50 performs an action to scrape a portion of a cliff object.
Figure 10B:
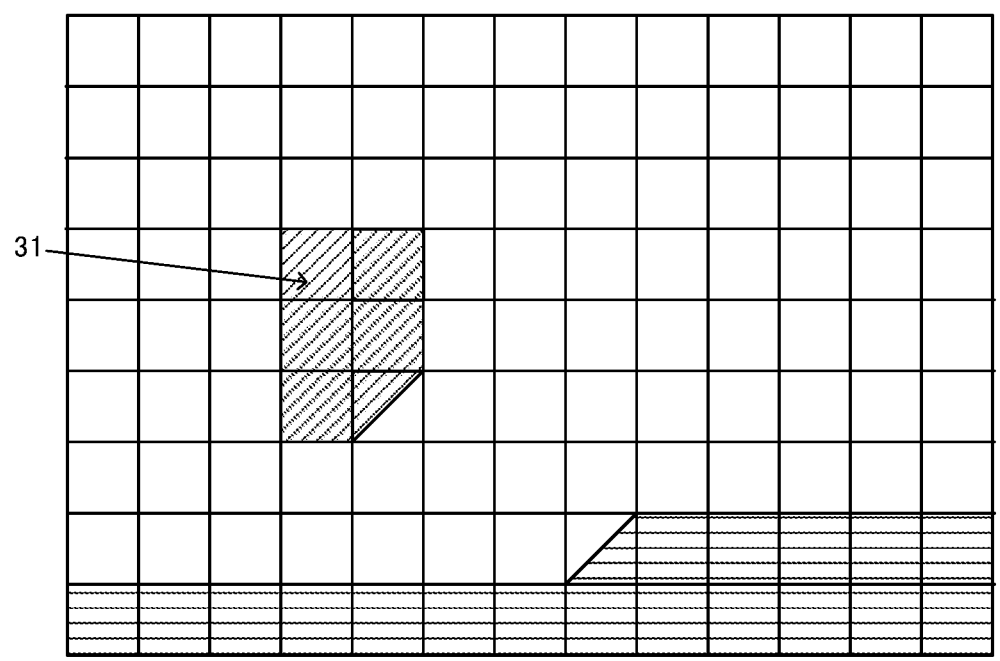
FIG. 10B is a diagram showing the virtual space as viewed from above after the user character 50 performs an action to scrape a portion of a cliff object.

Firstly, removal of a terrain part will be described. FIG. 9 is a diagram showing a non-limiting example image that is displayed on the display 12 when the user character 50 performs an action to scrape a portion of a cliff object. FIG. 10A is a diagram showing the virtual space as viewed from above before the user character 50 performs an action to scrape a portion of the cliff object. FIG. 10B is a diagram showing the virtual space as viewed from above after the user character 50 performs an action to scrape a portion of the cliff object.

For example, when the user character 50 is located right adjacent to the cliff object 31 as shown in FIG. 8, then if the user performs a predetermined operation, a portion of the cliff object 31 is scraped as shown in FIG. 9. Although in FIG. 9 a scraped portion of the cliff object 31 is indicated by a dashed line, the dashed-line portion is actually not displayed on the screen after that portion of the cliff object 31 is scraped.

Specifically, as shown in FIG. 10A, the cliff object 31 is formed of seven terrain parts before having been scraped. When the user character 50 is located near a position Pa, then if the user performs a predetermined operation, a terrain part GP1 at the position Pa is removed as shown in FIG. 10B.

More specifically, in the situation shown in FIG. 10A, information indicating that a terrain part GP1 is disposed at the position Pa is stored in the terrain part arrangement data. In this situation, when the user character 50 performs an action to scrape a cliff object, the information indicating that a terrain part GP1 is disposed at the position Pa is removed from the terrain part arrangement data. As a result, the terrain part GP1 that is a portion of the cliff object 31 is removed. Likewise, for a terrain part GP1 at a position Pb, information indicating that a terrain part GP1 is disposed at the position Pb is stored in the terrain part arrangement data before the user character 50 scrapes a cliff object. In this situation, when the user character 50 performs an action to scrape a cliff object, the information indicating that a terrain part GP1 is disposed at the position Pb is removed from the terrain part arrangement data.

Figure 11:
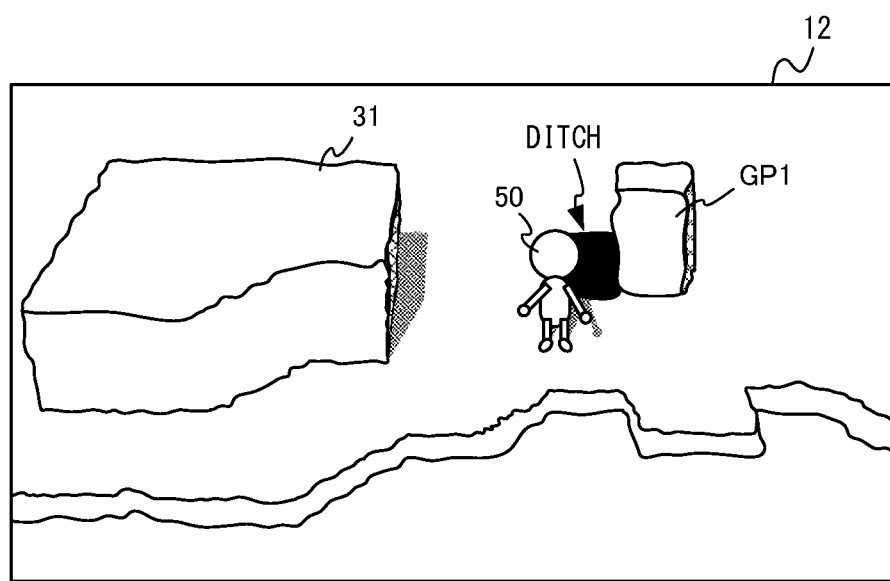
FIG. 11 is a diagram showing a non-limiting example image that is displayed on the display 12 when the user character 50 performs an action to dig the ground and heap earth on the ground.
Figure 12A:
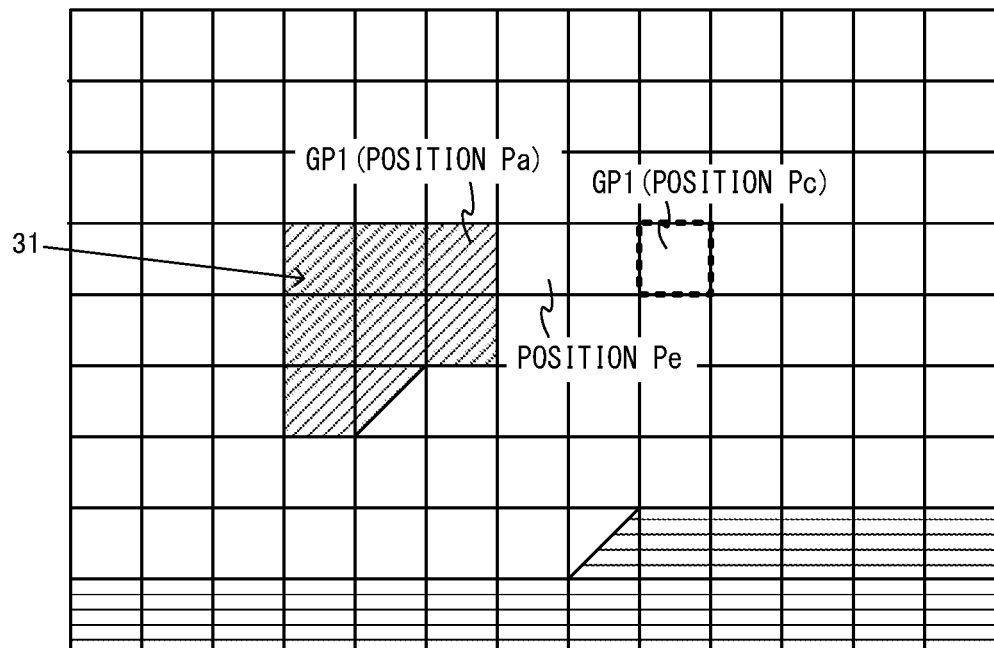
FIG. 12A is a diagram showing a non-limiting example virtual space as viewed from above before a terrain part GP1 is added.
Figure 12B:
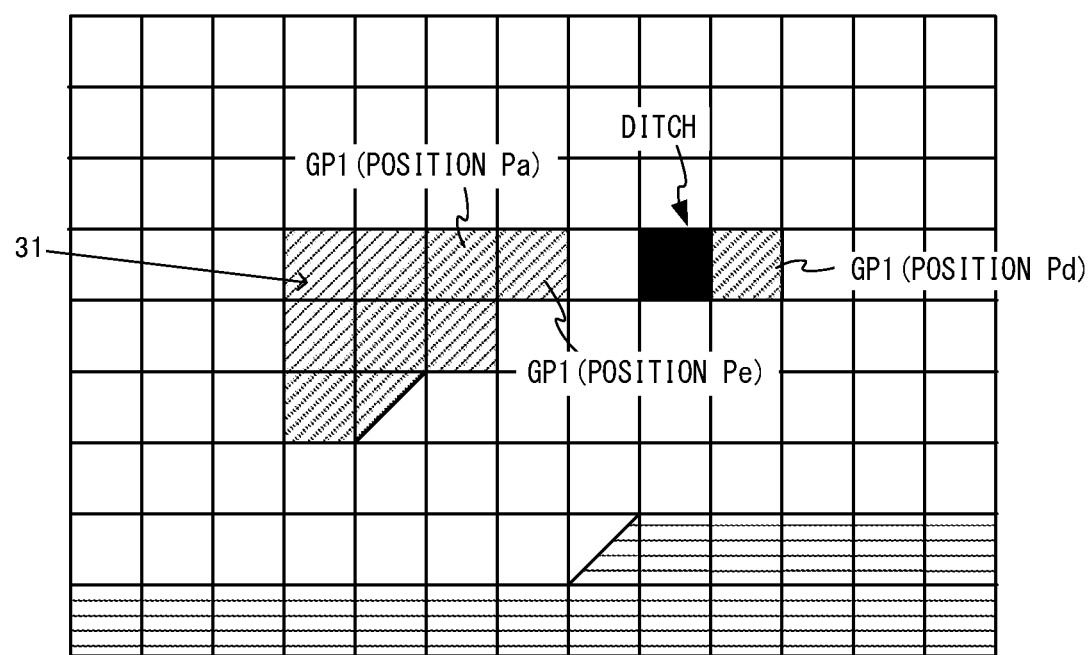
FIG. 12B is a diagram showing a non-limiting example virtual space as viewed from above after a terrain part GP1 is added.

Next, addition of a terrain part will be described. FIG. 11 is a diagram showing a non-limiting example image that is displayed on the display 12 when the user character 50 performs an action to dig the ground and heap earth on the ground. FIG. 12A is a diagram showing a non-limiting example virtual space as viewed from above before a terrain part GP1 is added. FIG. 12B is a diagram showing a non-limiting example virtual space as viewed from above after a terrain part GP1 is added.

As shown in FIG. 11, when the user character 50 is present on the ground, then if the user performs a predetermined operation, a portion of the ground is scraped, so that a ditch is formed at that portion of the ground. When the user further performs another predetermined operation, a new cliff object (a terrain part GP1) is added adjacent to the ditch. Specifically, when the user character 50 performs an action to dig a ditch at a position Pc indicated by a dashed line of FIG. 12A, the terrain part GP1 located at the position Pc is removed, so that a ditch is formed (FIG. 12B). Thereafter, when the user character 50 performs an action to heap earth, a terrain part GP1 is added at a position Pd adjacent to the ditch.

More specifically, information indicating that a terrain part GP1 is disposed at the position Pc is removed from the terrain part arrangement data, and information indicating that a terrain part GP1 is disposed at the position Pd is added to the terrain part arrangement data. Thereafter, when an image is rendered, the above first deformation process is performed. As a result, each vertex of the new terrain part GP1 is displaced, depending on the position in the virtual space of the vertex of the new terrain part GP1, so that the new terrain part GP1 is deformed. The displacement amounts of each vertex are calculated using expressions 1 and 2.

As described above, there are terrain parts that are allowed to adjoin each other and terrain parts that are not allowed to adjoin each other. When a terrain part is newly added, control is performed in such a manner that terrain parts that are allowed to adjoin each other adjoin each other (i.e., terrain parts that are not allowed to adjoin each other do not adjoin each other). Therefore, the kind of a terrain part that is to be added at a position is determined based on the kind of a terrain part located at a position adjacent to that position. In addition, when a terrain part is newly added in the virtual space, the new terrain part is located with the vertices in an adjoining portion of the two adjoining terrain parts sharing the same positions.

For example, when a terrain part is added to a position Pe right adjacent to the position Pa of FIG. 12A according to the user's operation, a terrain part GP1 is determined as a terrain part that can adjoin the terrain part GP1 located at the position Pa. In this case, as shown in FIG. 12B, vertices of the terrain part GP1 at the position Pa and vertices of the new terrain part GP1 added at the position Pe share the same positions in an adjoining portion between the terrain part GP1 at the position Pa and the new terrain part GP1 added at the position Pe. Thereafter, the above first deformation process is performed on the terrain parts including the newly added terrain part GP1.

Thus, even when a terrain part is newly added, the vertices in an adjoining portion of adjoining terrain parts share the same positions. Therefore, when the first deformation process is performed based on the positions of vertices in the virtual space, misalignment between adjoining terrain parts can be prevented.

Although not shown, the user may be allowed to replace a terrain part disposed in the virtual space with another terrain part. Specifically, the user may be allowed to remove a terrain part disposed in the virtual space, and newly dispose another terrain part. For example, when a first terrain part is present at a first position, the first terrain part placed at the first position may be replaced with a second terrain part according to the user's operation. In this case, before the terrain part replacement, information indicating that the first terrain part is disposed at the first position is stored in the terrain part arrangement data. Thereafter, according to the user's operation, information indicating that the second terrain part is disposed at the first position is stored into the terrain part arrangement data. Also in this case, control is performed in such a manner that terrain parts that are not allowed to adjoin each other do not adjoin each other. In addition, control is performed in such a manner that vertices in an adjoining portion share the same positions. Thereafter, when an image is rendered, the above first deformation process is performed.

As described above, in the first deformation process of this embodiment, each vertex of a terrain part disposed based on the terrain part arrangement data is displaced in the horizontal and depth directions, depending on the position in the virtual space thereof. The displacement amount of each vertex is calculated using a function indicating a predetermined waveform. As a result, a terrain formed by disposing a plurality of previously prepared terrain parts can be modified to look more natural. In addition, a terrain is formed by disposing a plurality of terrain parts, and therefore, development efficiency can be improved compared to the case where an entire terrain is formed as a non-segmented object.

In addition, when a terrain part is newly disposed, the first deformation process is performed. Therefore, the new terrain part does not have a fixed shape, and therefore, the formation of a monotonous terrain can be prevented. In addition, a terrain is formed based on the part shape data and the terrain part arrangement data. Therefore, it is easy to update an existing terrain, i.e. a terrain part can be easily newly disposed in an existing terrain, a terrain part can be easily removed from an existing terrain, a terrain part disposed in the virtual space can be easily replaced with another terrain part, etc. Even when updating such as addition, removal, and replacement is performed, a natural terrain can be obtained.

In addition, the vertices of terrain parts are displaced by the GPU 22 using the vertex shader function to generate an image, and therefore, each vertex can be displaced at high speed, so that a terrain can be deformed in real time.

(Second Deformation Process)

In this embodiment, a second deformation process is performed on a terrain object that has been deformed by the first deformation process as described above to further deform the entire terrain object. In the second deformation process, a terrain object and another object (the house object 40, the tree object 41, the user character 50, etc.) on the terrain object are each entirely deformed. The second deformation process will now be described.

Figure 13:
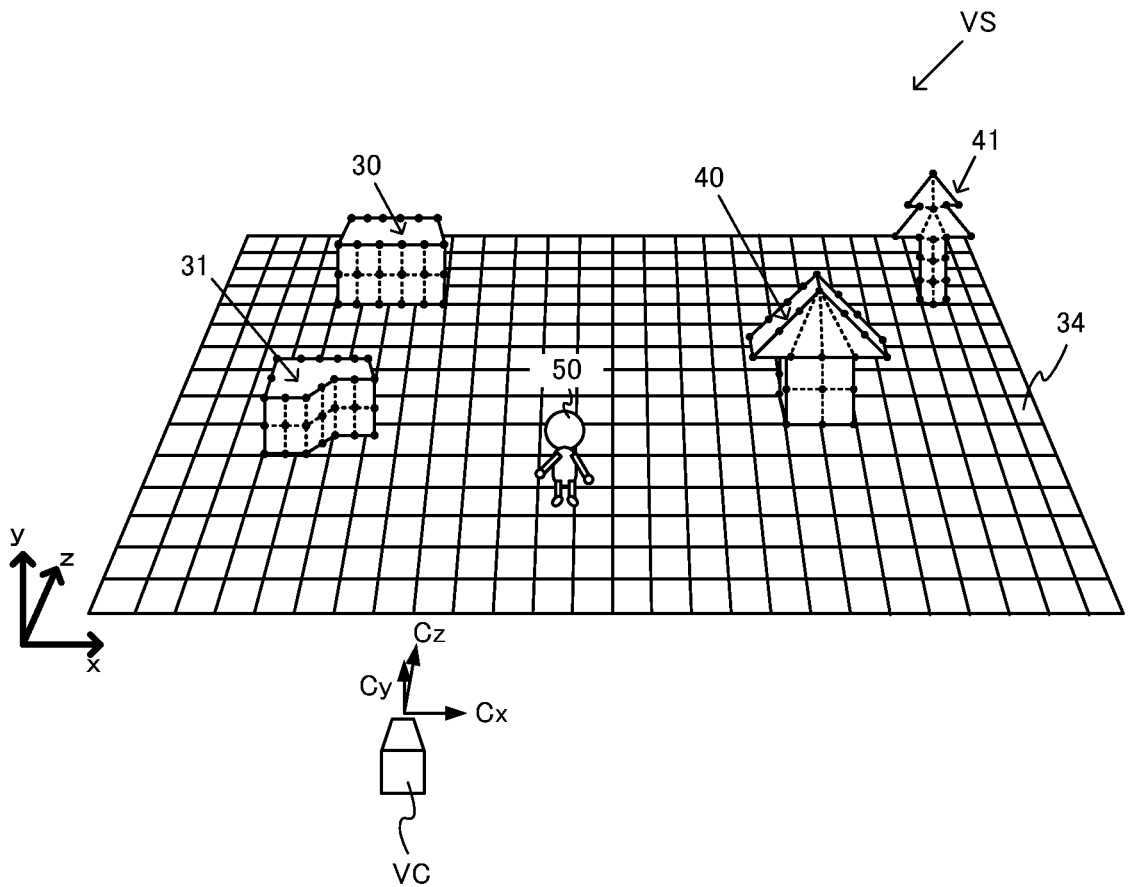
FIG. 13 is a diagram showing a non-limiting example virtual space after the first deformation process is performed and before a second deformation process is performed.

FIG. 13 is a diagram showing a non-limiting example virtual space after the first deformation process is performed and before the second deformation process is performed.

As shown in FIG. 13, in the virtual space, a ground object 34 and cliff objects 30 and 31 are disposed as terrain objects, and a house object 40, a tree object 41, and a user character 50 are disposed on the terrain objects. In addition, a virtual camera VC is set in the virtual space. For the virtual camera VC, a CxCyCz-coordinate system fixed to the virtual camera VC is set. The Cx-axis is the lateral direction axis of the virtual camera VC. The Cy-axis is the upward direction of the virtual camera VC. The Cz-axis is the line-of-sight direction of the virtual camera VC. In this embodiment, the Cx-axis is set to be parallel to the x-axis of the virtual space. The virtual camera VC is also movable in the height direction of the virtual space. When the virtual camera VC is moved in the height direction, the virtual camera VC is turned around the Cx-axis (pitch direction). Because the Cx-axis is set to be parallel to the x-axis of the virtual space, the direction in which the line-of-sight direction of the virtual camera VC extends along the ground 34 is parallel to the z-axis.

Figure 14:
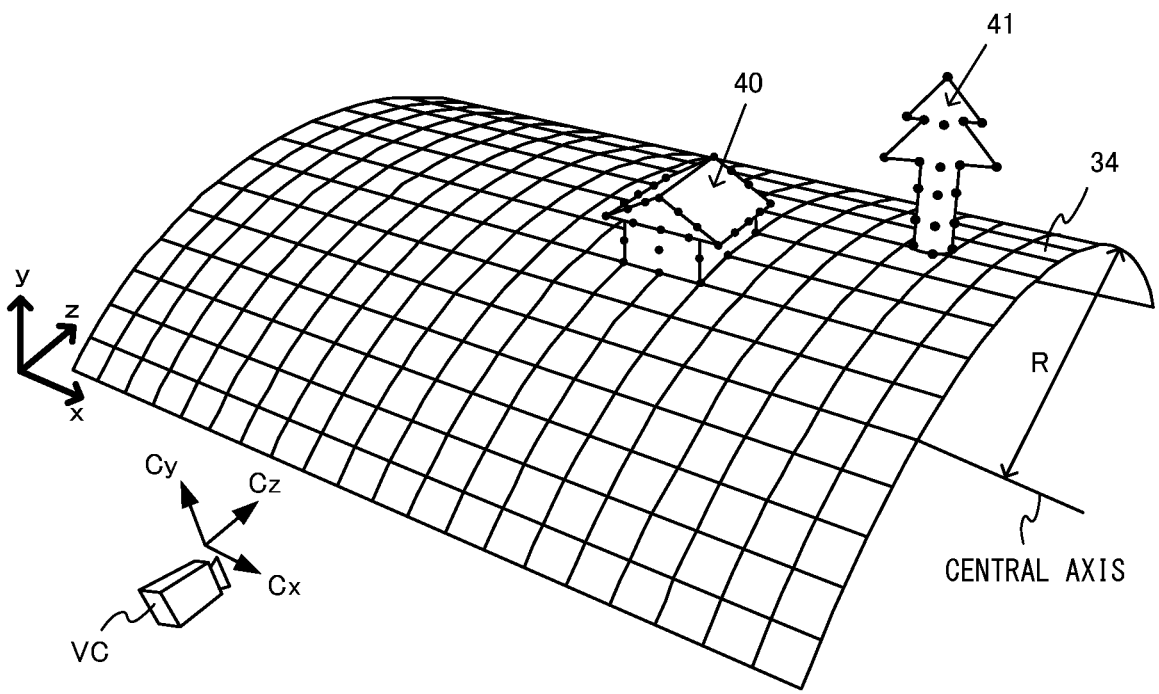
FIG. 14 is a diagram showing a non-limiting example virtual space after the second deformation process is performed.

The second deformation process is performed on the terrain and the objects on the terrain of FIG. 13. FIG. 14 is a diagram showing a non-limiting example virtual space after the second deformation process is performed.

As shown in FIG. 14, in the second deformation process, the entire terrain is deformed so that the ground 34 extends along a surface of a cylinder (drum). Specifically, the entire train is deformed so that the ground 34 (flat reference surface) that forms a part of the terrain is at least a portion of the side surface of a cylinder having a radius of R and a central axis parallel to the x-axis of the virtual space. Because the Cx-axis of the virtual camera VC is set to be parallel to the x-axis of the virtual space, the entire terrain is deformed so that the ground 34 gradually becomes lower in the line-of-sight direction of the virtual camera VC (the depth direction of the screen when an image is displayed). In addition, the objects (the house object 40, the tree object 41, the user character 50, etc.) on the terrain are deformed so that the objects are located along the ground 34.

Specifically, in the second deformation process, each of the vertices of terrain parts forming a terrain and each of the vertices of objects disposed on the terrain are subjected to coordinate conversion so that each vertex is turned around the x-axis. The second deformation process will now be described in greater detail with reference to FIGS. 15 and 16.

Figure 15:
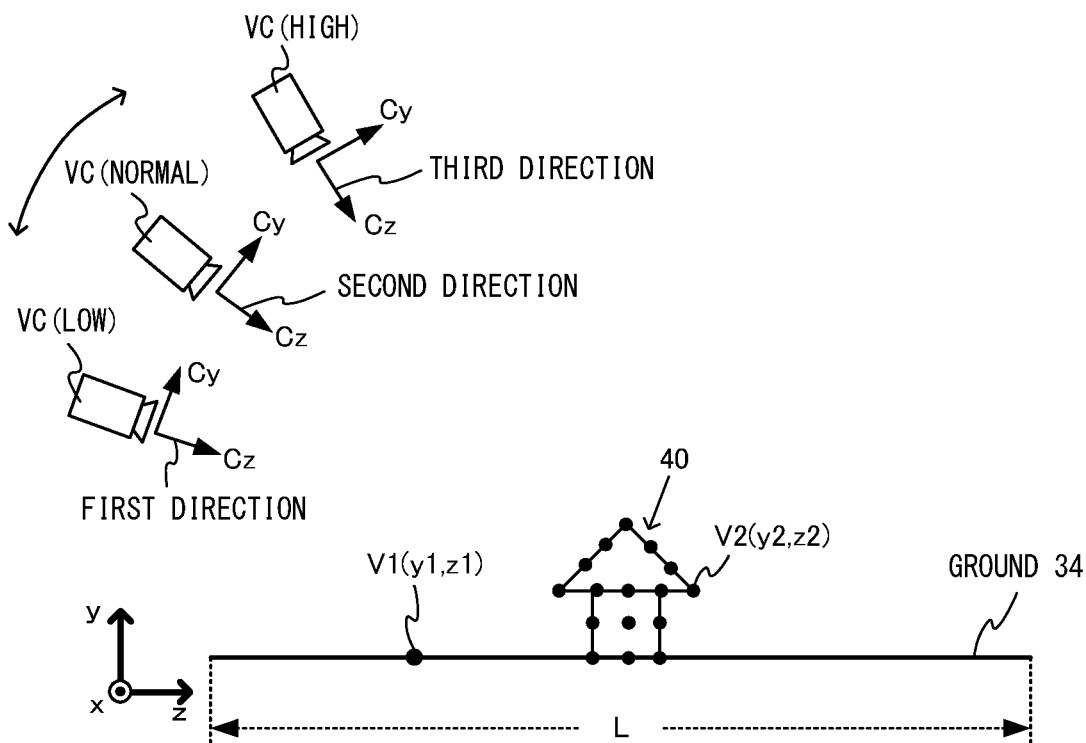
FIG. 15 is a diagram showing a non-limiting example virtual space as viewed in a direction parallel to an x-axis before the second deformation process is performed.
Figure 16:
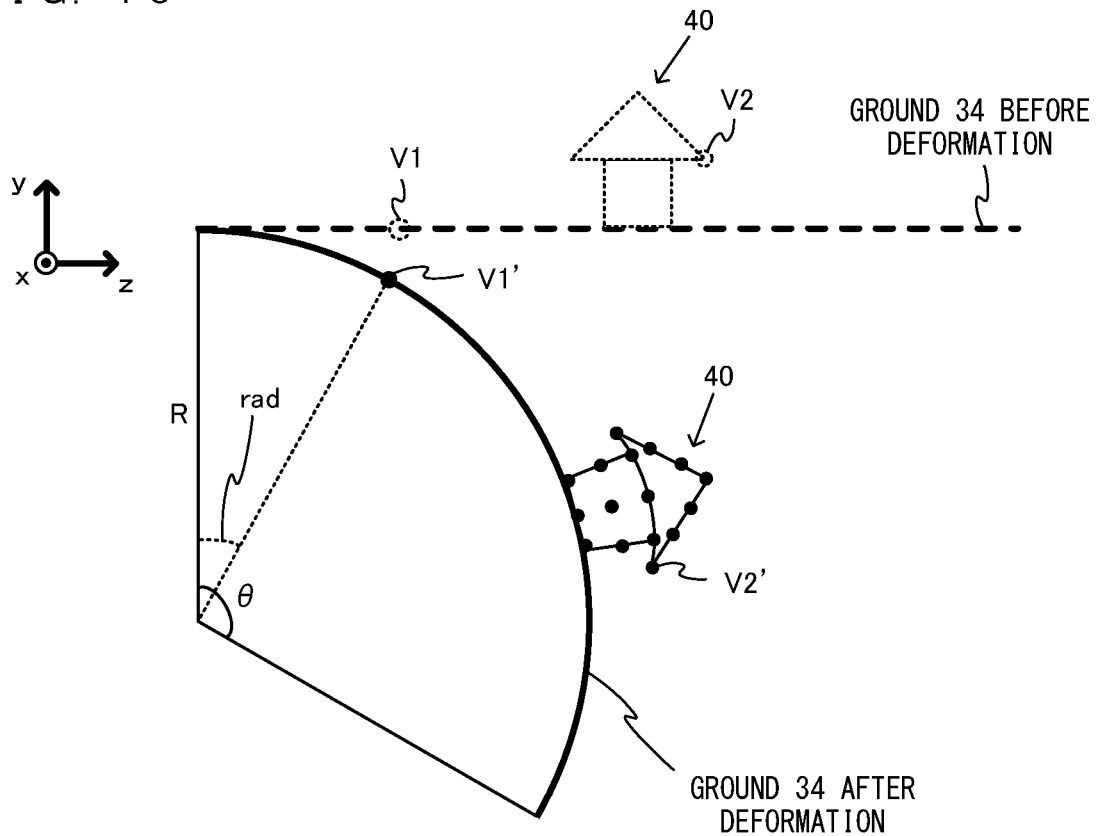
FIG. 16 is a diagram showing a non-limiting example virtual space as viewed in a direction parallel to the x-axis after the second deformation process is performed.

FIG. 15 is a diagram showing a non-limiting example virtual space as viewed in a direction parallel to the x-axis before the second deformation process is performed. FIG. 16 is a diagram showing a non-limiting example virtual space as viewed in a direction parallel to the x-axis after the second deformation process is performed.

As shown in FIG. 15, it is assumed that the y-coordinate value and z-coordinate value of a vertex V1 on the ground 34 (a vertex V1 of a terrain part that forms a part of the ground 34) are (y1, z1). It is also assumed that the y-coordinate value and z-coordinate value of a vertex V2 of the house object 40 are (y2, z2). It is also assumed that a predetermined distance in the z-axis direction is L. Note that L is a fixed value.

In this embodiment, the height of the virtual camera VC is changed according to the user's operation. For example, it is assumed that the position of the virtual camera VC can be set to "low," "normal," and "high." When the virtual camera VC is located at the "low" position, the line-of-sight direction of the virtual camera VC is set to a first direction, and the angle between the z-axis and the Cz-axis is set to a relatively small value (e.g., 0-20 degrees). In this case, an image of the virtual space as viewed from a side is displayed on the display 12. When the virtual camera VC is located at the "normal" position, the line-of-sight direction of the virtual camera VC is set to a second direction pointing further downward than the first direction, and the angle between the z-axis and the Cz-axis is set to a value (e.g., 45 degrees) greater than when the virtual camera VC is located at the "low" position. In this case, an image of the virtual space as viewed diagonally above is displayed. When the virtual camera VC is located at the "high" position, the line-of-sight direction of the virtual camera VC is set to a third direction pointing further downward than the second direction, and the angle between the z-axis and the Cz-axis is set to a relatively great value (e.g., 60-70 degrees). In this case, an image of the virtual space as viewed from above is displayed.

In this case, the vertices V1 and V2 of FIG. 15 are displaced to vertices V1' and V2' shown in FIG. 16. Specifically, the y-coordinate value and z-coordinate value (y', z') of a vertex V' after displacement are calculated based on the y-coordinate value and z-coordinate value (y, z) of a vertex V before displacement, using expressions 3-7. Note that the x-coordinate value of each vertex remains unchanged.

$$\text{rad}=\theta \times (z/L) \tag{3}$$

$$\text{temp}\_y=y+R \tag{4}$$

$$y\_t=\text{temp}\_y \times \cos(\text{rad}) \tag{5}$$

$$y'=y\_t-R \tag{6}$$

$$z'=\text{temp}\_y \times \sin(\text{rad}) \tag{7}$$

Here, $\theta$ represents the central angle of an arc that is determined based on the height of the virtual camera VC. R represents the radius of the arc (cylinder). Because the distance L in the z-axis direction has a fixed value and $\theta$ is determined based on the height of the virtual camera VC, R is determined based on L and $\theta$ (R$\theta$=L).

All the vertices of the terrain parts and the objects on the terrain are subjected to the coordinate conversion based on expressions 3-7. Specifically, each vertex is subjected to the coordinate conversion based on expressions 3-7, which depends on the position of the vertex in the z-axis direction. In other words, each vertex is subjected to the coordinate conversion based on expressions 3-7, which depends on the position of the vertex in the depth direction along the ground 34 (flat reference surface).

As shown in FIG. 16, for example, the vertex V1 on the ground 34 is displaced to a position on the arc having a radius of R and a central angle of $\theta$. By performing similar coordinate conversion on all vertices on the ground 34, the ground 34 is deformed so as to form a portion of the side surface of a cylinder having a radius of R. The vertex V2 of the house object 40 on the ground 34 is subjected to similar coordinate conversion to be displaced to a position shown in FIG. 16. By performing similar coordinate conversion on all vertices of the house object 40, the house object 40 is disposed on the side surface of the cylinder.

In the second deformation process, as in the first deformation process, each vertex is displaced by the GPU 22 using the vertex shader function. Specifically, the GPU 22 performs the coordinate conversion based on expressions 3-7 according to an instruction from the CPU 21. Thereafter, the GPU 22 performs a rendering process based on the virtual camera VC, and causes the display 12 to display an image. Specifically, each time an image is displayed on the display 12 (for each frame), the vertices of terrain parts and objects on the terrain are displaced by the GPU 22 using the vertex shader function, so that the entire terrain is deformed.

Note that $\theta$ is determined by the line-of-sight direction of the virtual camera VC (the height of the virtual camera VC). For example, when the line-of-sight direction of the virtual camera VC is set to the first direction, $\theta$ is set to a first value. When the line-of-sight direction of the virtual camera VC is set to the second direction, $\theta$ is set to a second value greater than the first value. Specifically, when the line-of-sight direction of the virtual camera VC is set to the second direction pointing further downward than the first direction, $\theta$ is set to a greater value. In other words, when the line-of-sight direction of the virtual camera VC is the second direction pointing further downward than the first direction, the resultant deformed ground has a greater curvature.

Meanwhile, when the line-of-sight direction of the virtual camera VC is set to the third direction pointing further downward than the second direction, the value of θ is set to a third value smaller than the first and second values. In other words, when the line-of-sight direction of the virtual camera VC is the third direction pointing further downward than the second direction, the resultant deformed ground has a smaller curvature.

Note that when the virtual camera VC is located at a position (e.g., the direction in which the virtual space is viewed from directly above) higher than the "high" position of FIG. 15, the second deformation process may not be performed. In other words, when the virtual camera VC is set at a position where the entire virtual space is viewed like looking at a map, the process of deforming the terrain and objects on the terrain into a drum shape may not be performed.

Figure 17A:
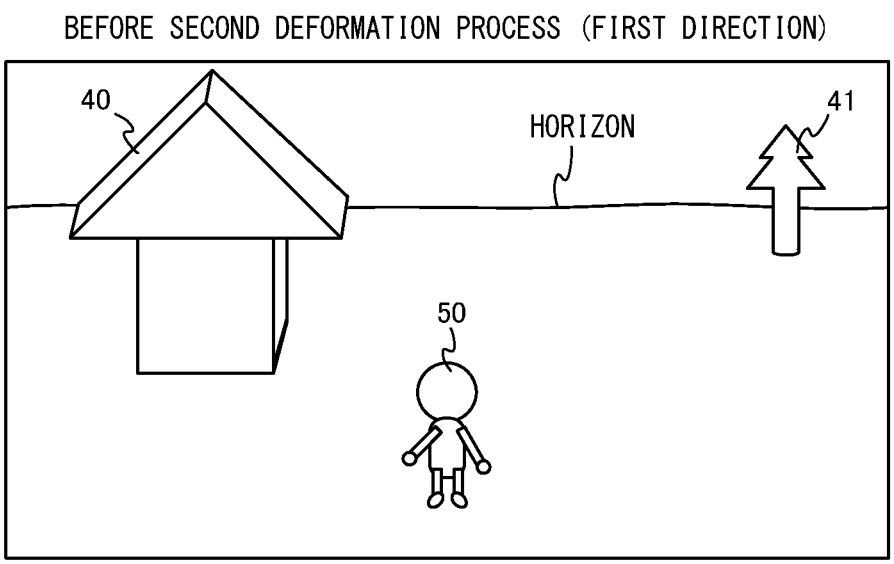
FIG. 17A is a diagram showing a non-limiting example image that is displayed on the display 12 when the line-of-sight direction of a virtual camera VC is a first direction and the second deformation process is not performed.
Figure 17B:
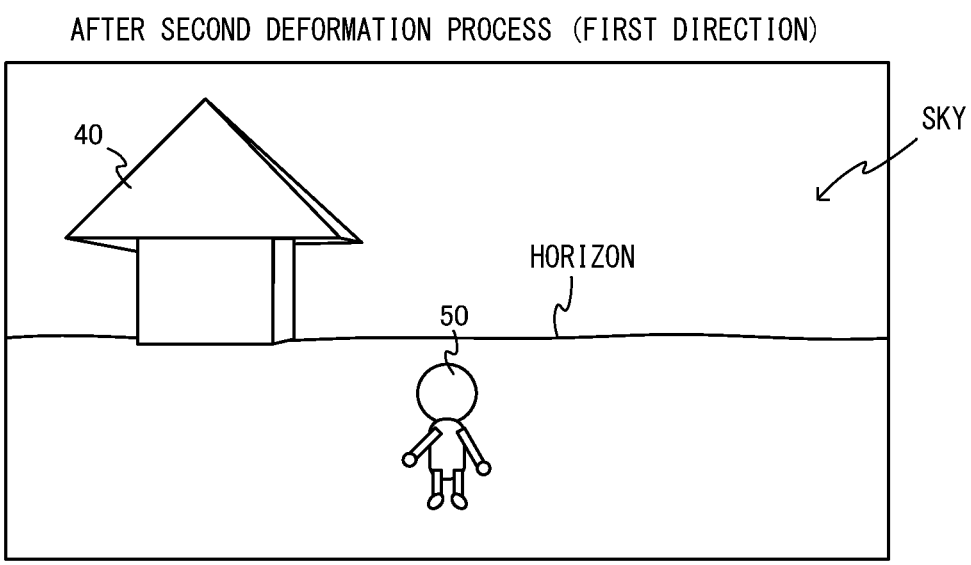
FIG. 17B is a diagram showing a non-limiting example image that is displayed on the display 12 when the line-of-sight direction of the virtual camera VC is the first direction and the second deformation process is performed.

FIG. 17A is a diagram showing a non-limiting example image that is displayed on the display 12 when the line-of-sight direction of the virtual camera VC is the first direction and the second deformation process is not performed. FIG. 17B is a diagram showing a non-limiting example image that is displayed on the display 12 when the line-of-sight direction of the virtual camera VC is the first direction and the second deformation process is performed.

As shown in FIG. 17A, when the line-of-sight direction of the virtual camera VC is the first direction and the second deformation process is not performed, the horizon and the tree object 41 are displayed in an upper portion of the screen. When the second deformation process is performed with the virtual camera VC positioned in this state, the tree object 41 disappears, as shown in FIG. 17B. In FIG. 17B, the horizon is moved to a lower position of the screen than in FIG. 17A, so that the area of the sky is increased. While an image of the house object 40 as viewed from above is displayed in FIG. 17A, an image of the house object 40 as viewed below is displayed in FIG. 17B.

Figure 18A:
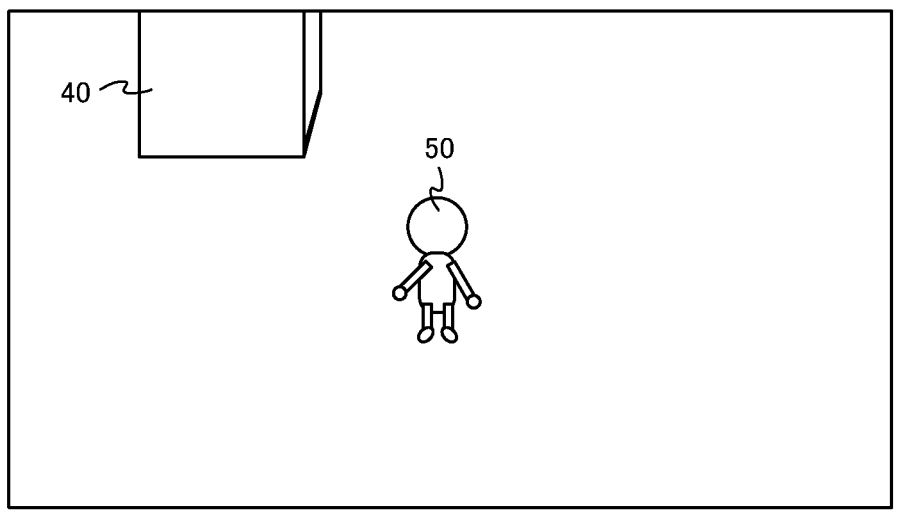
FIG. 18A is a diagram showing a non-limiting example image that is displayed on the display 12 when the line-of-sight direction of the virtual camera VC is a second direction and the second deformation process is not performed.
Figure 18B:
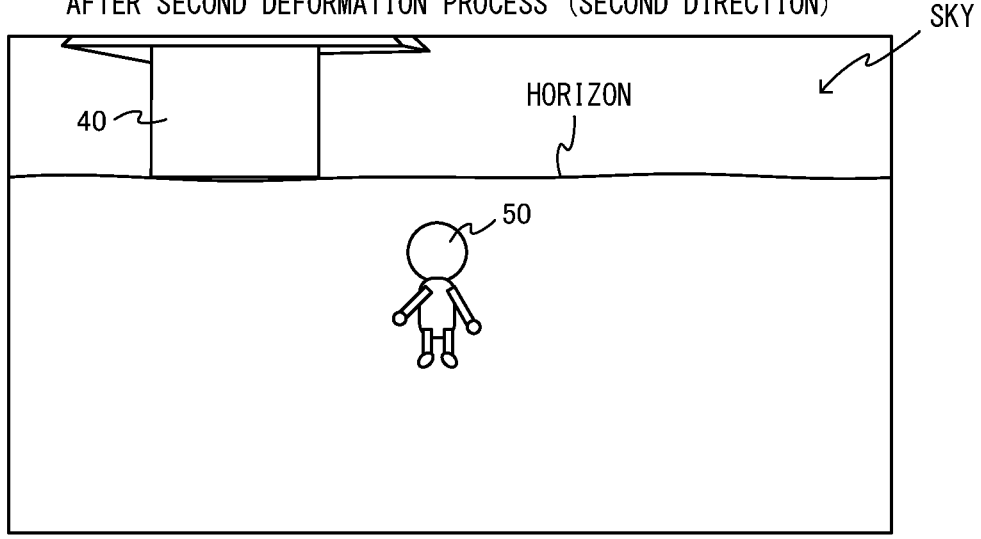
FIG. 18B is a diagram showing a non-limiting example image that is displayed on the display 12 when the line-of-sight direction of the virtual camera VC is the second direction and the second deformation process is performed.

FIG. 18A is a diagram showing a non-limiting example image that is displayed on the display 12 when the line-of-sight direction of the virtual camera VC is the second direction and the second deformation process is not performed. FIG. 18B is a diagram showing a non-limiting example image that is displayed on the display 12 when the line-of-sight direction of the virtual camera VC is the second direction and the second deformation process is performed.

As shown in FIG. 18A, when the line-of-sight direction of the virtual camera VC is the second direction and the second deformation process is not performed, neither the horizon nor the sky is displayed on the screen. When the second deformation process is performed with the virtual camera VC positioned in this state, the horizon and the sky appear as shown in FIG. 18B.

Figure 19A:
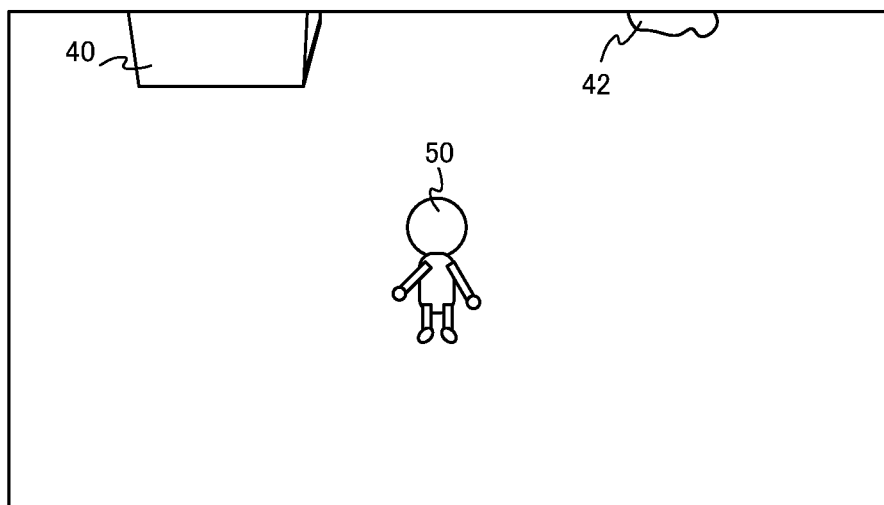
FIG. 19A is a diagram showing a non-limiting example image that is displayed on the display 12 when the line-of-sight direction of the virtual camera VC is a third direction and the second deformation process is not performed.
Figure 19B:
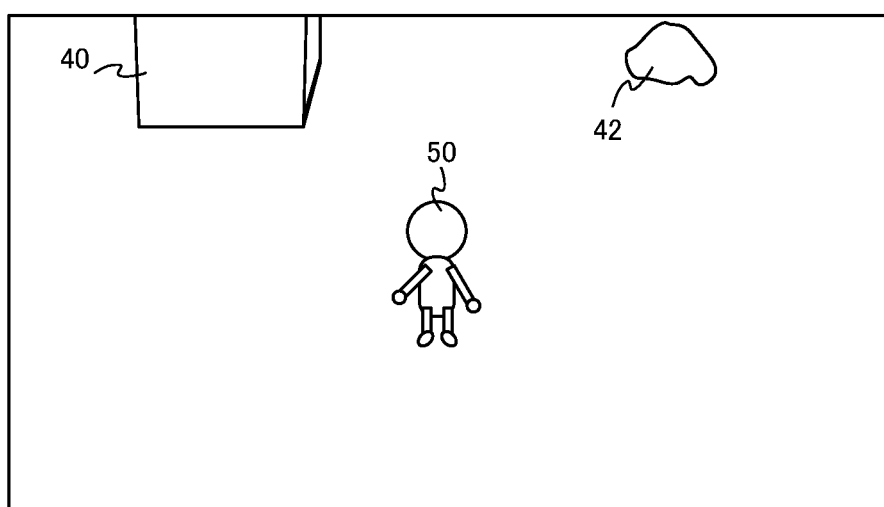
FIG. 19B is a diagram showing a non-limiting example image that is displayed on the display 12 when the line-of-sight direction of the virtual camera VC is the third direction and the second deformation process is performed.

FIG. 19A is a diagram showing a non-limiting example image that is displayed on the display 12 when the line-of-sight direction of the virtual camera VC is the third direction and the second deformation process is not performed. FIG. 19B is a diagram showing a non-limiting example image that is displayed on the display 12 when the line-of-sight direction of the virtual camera VC is the third direction and the second deformation process is performed.

As shown in FIG. 19A, when the line-of-sight direction of the virtual camera VC is the third direction and the second deformation process is not performed, a portion of the house object 40 and a portion of an rock object 42 are displayed near the upper edge of the screen, for example. When the second deformation process is performed with the virtual camera VC positioned in this state, the entire rock object 42 appears as shown in FIG. 19B.

Note that the user character 50 may move in the depth direction of the screen according to the user's operation. In this case, the display range is changed, depending on the movement of the user character 50, so that the user character 50 is displayed on the display 12.

Specifically, "rad" is calculated using the following expression 3' instead of expression 3.

$$rad = \theta \times ((z + OFFSET)/L) \qquad (3')$$

Here, "OFFSET" is determined based on the movement in the depth direction of the user character 50. As shown in expression 3', "rad" is calculated based on a value obtained by adding an offset value to z. Thereafter, "rad" calculated using expression 3' is substituted into expressions 4 and 7, so that the coordinate values of a converted vertex V are calculated. As a result, the entire terrain can be deformed into a drum shape, and the entirety of the drum-shaped terrain can be turned around the central axis of the drum, and therefore, apparent movement of the virtual camera VC can be achieved without actually moving the virtual camera VC in the virtual space. Specifically, by adding an offset value to the z-coordinate value as in expression 3', it looks as if the virtual camera VC moved in the depth direction by the amount of "OFFSET."

Figure 20:
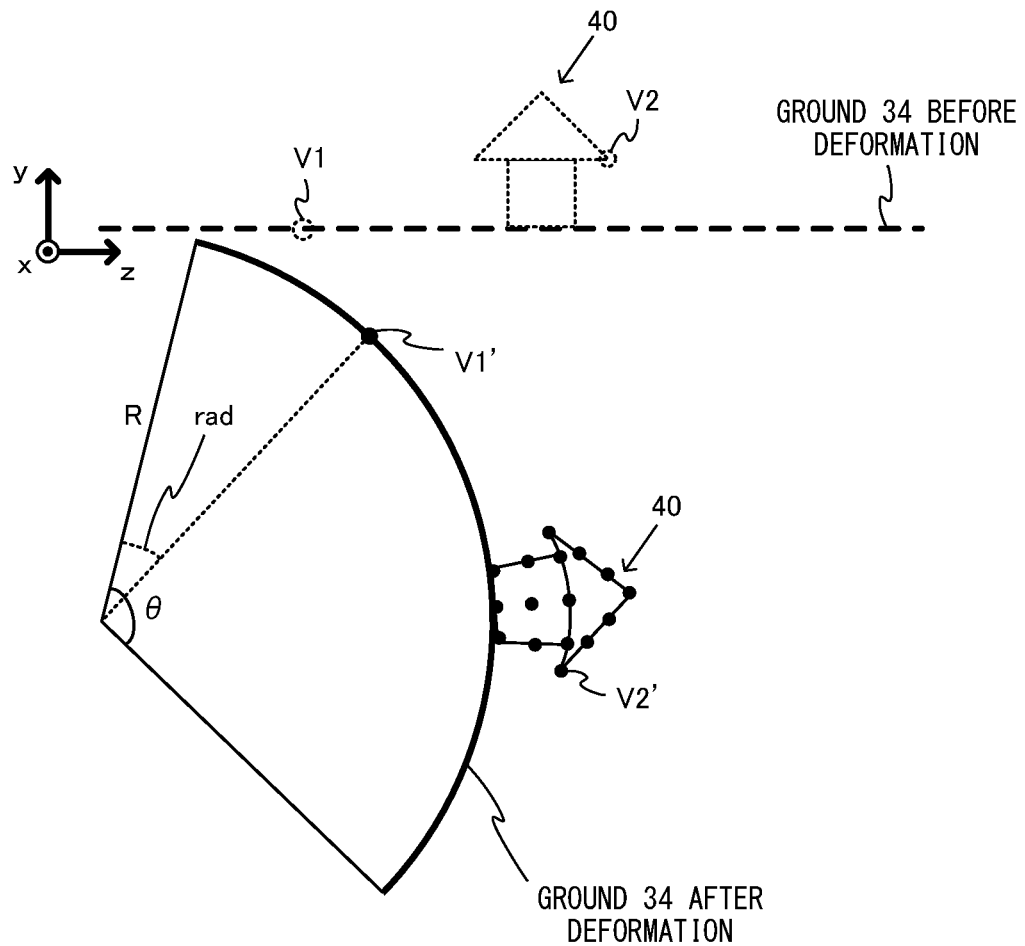
FIG. 20 is a diagram showing the virtual space as viewed in a direction parallel to the x-axis before and after deformation by adding an offset value to a z-coordinate value.

FIG. 20 is a diagram showing the virtual space as viewed in a direction parallel to the x-axis before and after deformation by adding an offset value to the z-coordinate value. Comparison between FIG. 16 and FIG. 20 indicates that the ground 34 and the house object 40 on the ground 34 have been turned around the central axis of a cylinder in FIG. 20. By adding an offset value to the z-coordinate value of each vertex and performing the coordinate conversion based on expressions 3'-7, the entire terrain including the terrain and the objects on the terrain can be turned in the circumferential direction of the side surface of a cylinder. As a result, when viewed from the virtual camera VC fixed in the virtual space, it looks as if the virtual camera VC moved in the circumferential direction of the cylinder (the depth direction of the screen).

As described above, in the second deformation process, each of the vertices of a flat terrain and objects (a house object, a tree object, a user character, etc.) on the terrain is subjected to coordinate conversion so that the entire terrain is deformed into a curved shape (drum shape). In addition, the curvature of the drum is changed, depending on a state (orientation or position) of the virtual camera VC. Specifically, when the line-of-sight direction of the virtual camera VC is the first direction, the curvature of the drum is decreased (θ is decreased), and when the line-of-sight direction of the virtual camera VC is the second direction pointing further downward than the first direction, the curvature of the drum is increased (θ is increased).

As a result, an image that is easy to see for the user can be provided. For example, comparison between FIG. 17A and FIG. 17B indicates that in FIG. 17B, a far area in the depth direction of the ground is not included in the display range, and therefore, an area near the user character 50 is more easily seen by the user, so that the game can be made more enjoyable. When the line-of-sight direction of the virtual camera VC is the first direction (lateral direction), the curvature is small, and therefore, even when the entire terrain is deformed into a drum shape, an image that is natural to the user can be provided. For example, in FIG. 17B, if the curvature is extremely great, the entire terrain looks greatly curved, so that an image that is unnatural to the user is likely to be displayed. However, in this embodiment, when the line-of-sight direction of the virtual camera VC is the first direction (lateral direction), the curvature of the drum is set to a small value, and therefore, such an unnatural feeling is less likely to occur.

In addition, in this embodiment, as shown in FIG. 19B, when the line-of-sight direction of the virtual camera VC is the third direction pointing further downward than the second direction, θ is set to a smaller value than when the line-of-sight direction of the virtual camera VC is the first and second directions. In other words, when the virtual space is viewed from above, the curvature of the drum is decreased. Therefore, when the virtual space is viewed from above, the distortion of the virtual space is reduced, and therefore, an image that is easy to see for the user can be provided.

In addition, in this embodiment, a flat terrain and objects on the terrain are subjected to the second deformation process, in which the vertices of the flat terrain and the objects on the terrain are displaced in real time by the GPU 22 using the vertex shader function. As a result, it is not necessary to previously prepare a curved terrain. In the case where a curved terrain is previously created, other objects (the house object 40 and the tree object 41) disposed on the terrain need to be created so as to fit the curved surface, and therefore, a game creator needs to spend a lot of time and effort. Specifically, when an object is disposed on a curved terrain, it is necessary to form the bottom surface of the object that is in contact with the ground, into a curved surface shape extending along the terrain, and it is also necessary to form the entire object into a shape that fits the bottom surface. In the case where different terrains having different curvatures are prepared, it is necessary to create objects for each curvature. However, in this embodiment, a flat terrain and objects disposed on the terrain are previously prepared, and the vertices of the flat terrain and the objects disposed on the terrain are displaced in real time by the GPU 22 using the vertex shader function. Therefore, it is not necessary to previously prepare a curved terrain or an object that fits the curved terrain. Therefore, game development efficiency can be improved.

(Details of Game Process)

Next, a non-limiting example game process that is performed in the body apparatus 2 will be specifically described. Firstly, data that is stored in the body apparatus 2 will be described.

Figure 21:
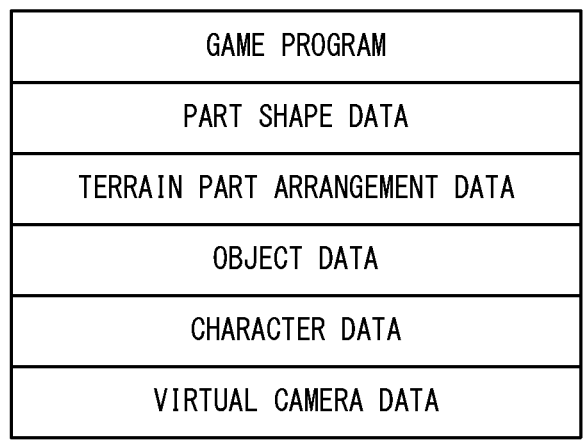
FIG. 21 is a diagram showing non-limiting example data stored in a body apparatus 2 (a DRAM 26 thereof)

FIG. 21 is a diagram showing non-limiting example data stored in the body apparatus 2 (the DRAM 26 thereof). As shown in FIG. 21, the body apparatus 2 stores a game program, part shape data, terrain part arrangement data, object data, character data, and virtual camera data. In addition to these kinds of data, the body apparatus 2 stores various kinds of data such as operation data corresponding to the user's operation, and other data used in a game.

The game program is for executing a game of this embodiment. The game program is, for example, stored in an external storage medium, and loaded from the external storage medium to the DRAM 26 during the start of the game.

The part shape data indicates the shapes of terrain parts, such as those shown in FIGS. 4A-4C. Data indicating each terrain part contains a plurality of pieces of vertex data. For example, data indicating a terrain part contains, as data indicating a position relative to a representative vertex. When a terrain part is disposed in the virtual space, the coordinate values in the virtual space of each vertex included in the terrain part are determined based on the data indicating the relative position. The part shape data is, for example, stored in an external storage medium, and loaded from the external storage medium to the DRAM 26 during the start of the game.

The terrain part arrangement data indicates positions of a plurality of terrain parts, indicating what terrain part is located at what position in the virtual space. When a plurality of terrain parts are disposed in the virtual space based on the terrain part arrangement data, the vertices in an adjoining portion of adjoining terrain parts share the same coordinate points. There are terrain parts that are allowed to adjoin each other and terrain parts that are not allowed to adjoin each other. The terrain part arrangement data is previously created by a game creator so that two terrain parts that are not allowed to adjoin each other do not adjoin each other. The terrain part arrangement data is, for example, stored in an external storage medium, and loaded from the external storage medium to the DRAM 26 during the start of the game. Note that during execution of a game process, the position of each terrain part determined by the terrain part arrangement data is changed. For example, when updating such as addition, removal, and replacement of a terrain part is performed according to the user's operation, the terrain part arrangement data initially stored in the DRAM 26 is updated according to the updating. In this case, the terrain part arrangement data is updated so that terrain parts that are not allowed to adjoin each other do not adjoin each other.

The object data indicates other kinds of objects (the house object 40 and the tree object 41) disposed on a terrain. Each piece of object data contains a plurality of vertices. A piece of object data contains, as data indicating each vertex, data indicating a position relative to a representative vertex. When an object (e.g., the house object 40) is disposed in the virtual space, the coordinate value in the virtual space of each vertex of the object is determined based on data indicating the relative position thereof. The object data is, for example, stored in an external storage medium, and loaded from the external storage medium to the DRAM 26 during the start of the game.

The character data contains data indicating the user character 50 disposed on a terrain. The data indicating the user character 50 contains a plurality of vertices, and as data indicating each vertex, data indicating a position relative to a representative vertex. Note that the character data may contain data indicating a character that is controlled by the CPU 21 (so-called CPU character).

The virtual camera data, which is related to a state of the virtual camera VC, indicates the position in the virtual space, line-of-sight direction, etc., of the virtual camera VC.

Next, a game process performed in the body apparatus 2 will be described in detail. FIG. 22 is a flowchart showing a non-limiting example game process performed in the processor 20 of the body apparatus 2. The process of FIG. 22 is performed by the CPU 21 or the GPU 22 of the body apparatus 2 executing a game program. Note that FIG. 22 shows only processes related to the first and second deformation processes, and does not show the other processes (e.g., the process of moving the user character 50 based on operation data, the process of causing the user character 50 to perform a predetermined action, etc.).

As shown in FIG. 22, the CPU 21 performs an initial process (step S100). In the initial process, a fixed xyz-coordinate system is set in the virtual space, and each terrain part is disposed in the virtual space based on the terrain part arrangement data. As a result, a terrain including a cliff object, a ground object, a river object, etc., is formed. By disposing each terrain part based on the terrain part arrangement data, the positions in the virtual space of the vertices of each terrain part are determined. Also in the initial process, other objects (the house object 40, the tree object 41, etc.) are disposed on the terrain. When the position in the virtual space of each object is determined, the positions in the virtual space of the vertices of each object are determined. In addition, the user character 50 is also disposed in the virtual space. When the position in the virtual space of the user character 50 is determined, the positions in the virtual space of the vertices of the user character 50 are determined. In addition, the virtual camera VC is disposed in the virtual space.

After step S100, the CPU 21 executes step S101. Thereafter, the CPU 21 executes steps S101-S110 repeatedly, i.e. at predetermined frame time intervals (e.g., ⅟60 sec).

In step S101, the CPU 21 determines whether or not to update the terrain. Specifically, the CPU 21 determines whether or not the user has performed the operation of adding a terrain part (e.g., the operation of heaping earth), the operation of removing a terrain part (e.g., the operation of scraping a cliff object, and the operation of digging the ground), or the operation of replacing a terrain part.

If it is determined that the terrain is to be updated (step S101: YES), the CPU 21 updates the terrain part arrangement data stored in the DRAM 26 (step S102). For example, when the user performs the operation of adding a terrain part at a position, the CPU 21 adds, to the terrain part arrangement data, information indicating that the terrain part is disposed at the position. When the user performs the operation of removing a terrain part at a position, the CPU 21 removes the terrain part at the position from the terrain part arrangement data. When the user performs the operation of replacing a terrain part at a position with another terrain part, the CPU 21 updates the terrain part arrangement data so as to replace the terrain part at the position with the second terrain part.

Here, the CPU 21 performs control in such a manner that when a terrain part is newly added or a terrain part is replaced, terrain parts that are not allowed to adjoin each other do not adjoin each other. For example, when a terrain part is added at a position, the CPU 21 determines the kind of the newly added terrain part based on the kind of a terrain part located at a position adjacent to the position of the newly added terrain part. Thereafter, the CPU 21 places the new terrain part in such a manner that the vertices in an adjoining portion of adjoining terrain parts share the same positions.

If step S102 has been executed or if the determination result of step S101 is negative (NO), the CPU 21 performs a virtual camera setting process (step S103). Specifically, the CPU 21 sets the height (line-of-sight direction) of the virtual camera VC according to the user's operation. When the user changes the height of the virtual camera VC, the CPU 21 sets the height (position and line-of-sight direction) of the virtual camera VC. When the user performs the operation of moving the user character 50 in the lateral direction (x-axis direction), in step S103 the CPU 21 moves the virtual camera VC in the lateral direction (x-axis direction) of the virtual space according to the operation.

Following step S103, the CPU 21 sets the central angle θ, depending on the state of the virtual camera VC (step S104). Specifically, the CPU 21 sets the central angle θ based on the line-of-sight direction (height) of the virtual camera VC set in step S103.

Next, the CPU 21 determines whether or not the user character 50 has moved in the depth direction (z-axis direction) according to the user's operation (step S105).

If it is determined that the user character 50 has moved in the depth direction (step S105: YES), the CPU 21 sets an offset value (step S106). The offset value set in this case is the "OFFSET" of expression 3'. Specifically, the CPU 21 sets the offset value based on the movement of the user character 50 in the z-axis direction. For example, the CPU 21 sets a negative offset value if the user character 50 has moved in the positive z-axis direction, and a positive offset value if the user character 50 has moved in the negative z-axis direction.

If step S106 has been executed or if the determination result of step S105 is negative (NO), the CPU 21 causes the GPU 22 to execute the first deformation process for deforming the vertices of each terrain part (step S107). Specifically, the GPU 22 displaces the vertices of each terrain part disposed in the virtual space based on the terrain part arrangement data, using the vertex shader function, based on expressions 1 and 2. As a result, the vertices of each terrain part are displaced according to the position in the virtual space, so that the terrain is deformed as shown in FIG. 6.

Following step S107, the CPU 21 causes the GPU 22 to execute the second deformation process of deforming the terrain and the objects on the terrain (step S108). The GPU 22 displaces the vertices of the terrain deformed by the first deformation process and the objects on the terrain, using the vertex shader function, so that the resultant vertices form a drum shape. Specifically, the GPU 22 displaces the vertices of each terrain part deformed by the first deformation process and the objects (the house object 40, the tree object 41, the user character 50, etc.) on the terrain, using expressions 3-7. By performing the second deformation process, the flat ground is deformed to form a portion of the side surface of a cylinder, and the objects on the ground are disposed on the side surface of the cylinder. Note that if the offset value has been set in step S106, the displacement of the vertices is calculated using expression 3'.

Thereafter, the CPU 21 causes the GPU 22 to perform a rendering process based on the virtual camera VC (step S109). Specifically, the GPU 22 generates an image of the terrain and the objects on the terrain that have been deformed by the first and second deformation processes, as viewed from the virtual camera VC. The generated image is output to the display 12, on which the image of the virtual space is displayed (step S110).

Note that the first deformation process of step S107 and the second deformation process of step S108 are performed only on vertices included in the image capture range of the virtual camera VC. In other words, the first and second deformation processes are not performed on vertices that are not included in the image capture range of the virtual camera VC. Specifically, the first and second deformation processes are performed on vertices that will be included in the viewing frustum of the virtual camera VC after the first and second deformation processes have been performed.

If step S110 has been performed, the CPU 21 executes step S101 again. Thus, FIG. 22 has been described.

Thus, the first deformation process of step S107 and the second deformation process of step S108 are executed repeatedly, i.e. at frame time intervals. Even when a terrain part is added, remove, or replaced, the first and second deformation processes are performed in real time.

As described above, in this embodiment, the first deformation process is performed on a terrain formed by disposing a plurality of terrain parts based on the terrain part arrangement data. In the first deformation process, the vertices of terrain parts are each displaced in the x-axis and z-axis directions, depending on the position thereof in the virtual space. The displacement amount of each vertex is determined by a function representing a predetermined waveform. Specifically, the displacement amount is determined based on expressions 1 and 2. By the first deformation process, a terrain formed by disposing a plurality of kinds of terrain parts can be changed to look natural. In addition, a terrain is formed by disposing a plurality of terrain parts, and therefore, a terrain can be more efficiently created than when an entire terrain is individually created, resulting in an improvement in game development efficiency. In addition, updating (addition, removal, replacement, etc.) of a terrain part can be easily performed, resulting in extensibility.

In, this embodiment, in addition to the first deformation process, the second deformation process of deforming the entire terrain into a curved shape is performed. As a result, the entire terrain can be deformed so as to be easily seen by the user, and it is not necessary for a game creator to previously create a deformed terrain (curved terrain) or an object on a deformed terrain. Therefore, the cost and time of development can be reduced, resulting in an improvement in development efficiency.

(Variations)

In the foregoing, the image processing of this embodiment has been described. The above embodiment is merely for illustrative purposes. The following variations may be additionally provided, for example.

For example, in the above embodiment, it is assumed that each terrain part has a square shape in the x-axis and z-axis directions. In other words, each terrain part has a square shape as viewed in the y-axis direction. A terrain is formed by disposing such terrain parts in a grid pattern. However, such a terrain part shape is merely for illustrative purposes. Each terrain part may have a predetermined shape (e.g., a square, rectangle, rhombus, parallelogram, triangle, or polygon) as viewed in the y-axis direction. Specifically, terrain parts may have the same predetermined shape in the x-axis and z-axis directions, and a terrain may be formed by disposing a plurality of terrain parts having the same predetermined shape. The first and second deformation processes may be performed on such a terrain.

In the above embodiment, it is assumed in the first deformation process, each terrain part is displaced in the x-axis direction (lateral direction) and z-axis direction (depth direction) of the virtual space, and is not displaced in the y-axis direction (height direction). In another embodiment, each terrain part may also be displaced in the height direction of the virtual space. In still another embodiment, in the first deformation process, each terrain part may be displaced in at least one of the lateral direction, depth direction, and height direction of the virtual space.

In the above embodiment, in the first deformation process, the vertices of a terrain part are displaced using a function having a predetermined waveform (expressions 1 and 2). Alternatively, the vertices of a terrain part may be displaced using any other suitable function. In addition, the vertices of a terrain part may be displaced randomly, depending on the positions thereof.

In the above embodiment, in the first deformation process, terrain objects (a ground object and a cliff object) are deformed, and other objects on terrain objects are not deformed. In another embodiment, in the first deformation process, other objects (the house object 40, the tree object 41, the user character 50, etc.) on terrain objects may also be deformed.

In the above embodiment, it is assumed that the orientation of the virtual camera VC is changeable only around the x-axis. In other words, it is assumed that the orientation of the virtual camera VC is changeable only in the pitch direction. In another embodiment, the orientation of the virtual camera VC may be changeable around the y-axis (yaw direction). In this case, in the second deformation process, the ground may be deformed into a drum shape so that when the Cz-axis of the virtual camera VC is projected onto a flat reference surface (the ground) of the virtual space, the Cz-axis projected on the flat reference surface points in the circumferential direction of a cylinder. In other words, an entire terrain may be deformed by performing coordinate conversion of vertices, depending on the positions of the vertices in the depth direction along the flat reference surface, so that the flat reference surface (ground) is changed to form the side surface of a cylinder having a central axis pointing in a direction perpendicular to the line-of-sight direction of the virtual camera.

In the above embodiment, in the second deformation process, the ground as a flat reference surface is deformed into a drum shape. In another embodiment, the flat reference surface is not limited to the ground. For example, the flat reference surface may be the sea surface. The flat reference surface may be internally set in the virtual space and may not actually be displayed in the game. In this case, a terrain displayed as an image may be formed based on the flat reference surface. In the second deformation process, the reference surface is deformed into the side surface of a cylinder, so that the entire terrain is also deformed into a drum shape.

In the above embodiment, in the second deformation process, the ground (flat reference surface) is deformed into a drum shape. In another embodiment, in the second deformation process, the ground may be deformed into other curved shapes. For example, in the second deformation process, the ground may be deformed into a spherical shape (all or a portion of a sphere). Specifically, coordinate conversion of each vertex may be performed so that the ground forms all or a portion of the surface of a sphere. Alternatively, for example, each vertex may be displaced so that the ground is deformed in a direction opposite to that of FIG. 16 (upward in FIG. 16).

In the above embodiment, in the first and second deformation processes, each vertex is displaced by the GPU 22 using the vertex shader function. In another embodiment, each vertex may be displaced by the CPU 21.

The process of the above flowchart is merely for illustrative purposes. The order and details of the steps may be changed as appropriate.

The above game is merely for illustrative purposes. The first deformation process and/or the second deformation process may be performed in any other suitable games.

In the above embodiment, it is assumed that the above process is performed in the body apparatus 2 of the game system 1. Alternatively, the above process may be performed in any other suitable information processing apparatuses (e.g., a personal computer, smartphone, and tablet terminal), etc. In still another embodiment, the above process may be performed in an information processing system including a plurality of apparatuses (e.g., a system including a terminal and a server).

In the foregoing, this embodiment has been described. The above description is merely an illustration of this embodiment, and various modifications and changes may be made thereto.

While certain example systems, methods, devices and apparatuses have been described herein, it is to be understood that the appended claims are not to be limited to the systems, methods, devices and apparatuses disclosed, but on the contrary, are intended to cover various modifications and equivalent arrangements included within the spirit and scope of the appended claims.

What is claimed is:

1. An information processing apparatus comprising:
storage configured to store terrain part shape data indicating shapes of a plurality of kinds of terrain parts for a terrain in a virtual space, and terrain part arrangement data indicating positions of a plurality of the terrain parts in the virtual space, the terrain part shape data comprising at least vertex data for vertices of the terrain parts; and
a processor configured to execute:
forming a terrain in the virtual space by disposing a plurality of terrain parts in the virtual space based on the terrain part arrangement data;
based on the positions of the plurality of terrain parts in the virtual space, deforming each of the terrain parts disposed in the virtual space to form a deformed terrain, wherein the deformed terrain is deformed relative to the terrain formed by disposing the plurality of the terrain parts based on the terrain part arrangement data and wherein, in the deforming, each respective terrain part disposed in the virtual space is deformed by adding to each vertex of the respective terrain part, a displacement depending on a coordinate in the virtual space of the vertex; and
rendering the virtual space including the deformed terrain formed of the terrain parts deformed by the deforming, based on a virtual camera, wherein
the processor comprises a graphics processor having a vertex shader function, and
the graphic processor is configured to execute the deforming using the vertex shader function.

2. The information processing apparatus according to claim 1, wherein
in the deforming, the displacement of each vertex is determined based on a function representing a waveform, and the coordinate in the virtual space of the vertex.

3. The information processing apparatus according to claim 1, wherein
the terrain part shape data enables vertices in an adjoining portion of adjoining terrain parts in the virtual space to share the same position.

4. The information processing apparatus according to claim 1, wherein
each terrain part has a three-dimensional shape having a predetermined shape in a lateral direction and a depth direction of the virtual space, and
the terrain part arrangement data indicates an arrangement of a plurality of terrain parts having the predetermined shape in the horizontal and depth directions, wherein the terrain parts are disposed in the horizontal and depth directions of the virtual space.

5. The information processing apparatus according to claim 1, wherein
the processor is further configured to execute deforming each of the terrain parts by converting a vertex position of each of the plurality of terrain parts forming the terrain so as to deform the entire terrain formed by disposing the terrain parts into a curved shape.

6. The information processing apparatus according to claim 1, wherein the processor is configured to deform each of the terrain parts disposed in the virtual space each time an image of the virtual space is rendered.

7. The information processing apparatus according to claim 1, wherein the deforming deforms a respective terrain part relative to a shape of the respective terrain part indicated by corresponding stored terrain part shape data.

8. An information processing apparatus comprising:
storage configured to store terrain part shape data indicating shapes of a plurality of kinds of terrain parts for a terrain in a virtual space, and terrain part arrangement data indicating positions of a plurality of the terrain parts in the virtual space; and
a processor configured to execute:
forming a terrain in the virtual space by disposing a plurality of terrain parts in the virtual space based on the terrain part arrangement data;
based on the positions of the plurality of terrain parts in the virtual space, deforming each of the terrain parts disposed in the virtual space to form a deformed terrain, wherein the deformed terrain is deformed relative to the terrain formed by disposing the plurality of the terrain parts based on the terrain part arrangement data, and
rendering the virtual space including the deformed terrain formed of the terrain parts deformed by the deforming, based on a virtual camera, wherein
the processor is further configured to execute;
adding, removing, or replacing a terrain part of the deformed terrain according to an instruction input to the information processing apparatus, and
storing terrain part arrangement data in the memory based on the updating.

9. The information processing apparatus according to claim 8, wherein
in the updating, when a terrain part is added in the virtual space, the added terrain part is disposed in the virtual space with vertices in an adjoining portion of the added terrain part and another terrain part adjoining the added terrain part sharing the same position.

10. A non-transitory computer-readable storage medium having stored therein an information processing program, the program causing a computer of an information processing apparatus to execute:
reading terrain part shape data indicating shapes of a plurality of kinds of terrain parts for a terrain in a virtual space, and terrain part arrangement data indicating positions of a plurality of the terrain parts in the virtual space, the terrain part shape data comprising at least vertex data for vertices of the terrain parts;
forming a terrain in the virtual space by disposing a plurality of terrain parts in the virtual space based on the terrain part arrangement data;
based on the positions of the plurality of the terrain parts in the virtual space, deforming each of the terrain parts disposed in the virtual space to form a deformed terrain wherein the deformed terrain is deformed relative to the terrain formed by disposing the plurality of the terrain parts based on the terrain part arrangement data and wherein, in the deforming, each respective terrain part disposed in the virtual space is deformed by adding to each vertex of the respective terrain part, a displacement depending on a coordinate in the virtual space of the vertex; and
rendering the virtual space including the deformed terrain formed of the terrain parts deformed by the deforming, based on a virtual camera, wherein the computer of the information processing apparatus comprises a graphics processor having a vertex shader function and the method further comprises:

executing the deforming using the vertex shader.

11. The non-transitory computer-readable storage medium according to claim 10, wherein
in the deforming, the displacement of each vertex is determined based on a function representing a waveform, and the coordinate in the virtual space of the vertex.

12. The non-transitory computer-readable storage medium according to claim 10, wherein
the terrain part shape data enables vertices in an adjoining portion of adjoining terrain parts in the virtual space to share the same position.

13. The non-transitory computer-readable storage medium according to claim 10, wherein
each terrain part has a three-dimensional shape having a predetermined shape in a lateral direction and a depth direction of the virtual space, and
the terrain part arrangement data indicates an arrangement of a plurality of terrain parts having the predetermined shape in the horizontal and depth directions, wherein the terrain parts are disposed in the horizontal and depth directions of the virtual space.

14. The non-transitory computer-readable storage medium according to claim 10, wherein
the information processing program causes the computer to further execute:
deforming each of the terrain parts by converting a vertex position of each of the plurality of terrain parts forming the terrain so as to deform the entire terrain formed by disposing the terrain parts into a curved shape.

15. A non-transitory computer-readable storage medium having stored therein an information processing program, the program causing a computer of an information processing apparatus to execute:
reading terrain part shape data indicating shapes of a plurality of kinds of terrain parts for a terrain in a virtual space, and terrain part arrangement data indicating positions of a plurality of the terrain parts in the virtual space;
forming a terrain in the virtual space by disposing a plurality of terrain parts in the virtual space based on the terrain part arrangement data;
based on the positions of the plurality of the terrain parts in the virtual space, deforming each of the terrain parts disposed in the virtual space to form a deformed terrain wherein the deformed terrain is deformed relative to the terrain formed by disposing the plurality of the terrain parts based on the terrain part arrangement data; and
rendering the virtual space including the deformed terrain formed of the terrain parts deformed by the deforming, based on a virtual camera, wherein
the information processing program causes the computer to further execute:
adding, removing, or replacing a terrain part of the deformed terrain according to an instruction input to the information processing apparatus, and
storing terrain part arrangement data based on the updating.

16. The non-transitory computer-readable storage medium according to claim 15, wherein
in the updating, when a terrain part is added in the virtual space, the added terrain part is disposed in the virtual space with vertices in an adjoining portion of the added terrain part and another terrain part adjoining the added terrain part sharing the same position.

17. An information processing method to be executed in an information processing system, the information processing method comprising:
reading, from a storage, terrain part shape data indicating shapes of a plurality of kinds of terrain parts for a terrain in a virtual space, and terrain part arrangement data indicating positions of a plurality of the terrain parts in the virtual space, the terrain part shape data comprising at least vertex data for vertices of the terrain parts;
forming a terrain in the virtual space by disposing a plurality of terrain parts in the virtual space based on the terrain part arrangement data;
based on the positions of the plurality of the terrain parts in the virtual space, deforming each of the terrain parts disposed in the virtual space to form a deformed terrain, wherein the deformed terrain is deformed relative to the terrain formed by disposing the plurality of the terrain parts based on the terrain part arrangement data, wherein, in the deforming, each respective terrain part disposed in the virtual space is deformed by adding to each vertex of the respective terrain part, a displacement depending on a coordinate in the virtual space of the vertex; and
rendering the virtual space including the deformed terrain formed of the terrain parts deformed by the deforming, based on a virtual camera, wherein the information processing system comprises a graphics processor having a vertex shader function and the method further comprises:
executing the deforming using the vertex shader function.

18. An information processing method to be executed in an information processing system, the information processing method comprising:
reading, from a storage, terrain part shape data indicating shapes of a plurality of kinds of terrain parts for a terrain in a virtual space, and terrain part arrangement data indicating positions of a plurality of the terrain parts in the virtual space;
forming a terrain in the virtual space by disposing a plurality of terrain parts in the virtual space based on the terrain part arrangement data;
based on the positions of the plurality of the terrain parts in the virtual space, deforming each of the terrain parts disposed in the virtual space to form a deformed terrain wherein the deformed terrain is deformed relative to the terrain formed by disposing the plurality of the terrain parts based on the terrain part arrangement data; and
rendering the virtual space including the deformed terrain formed of the terrain parts deformed by the deforming, based on a virtual camera, wherein
the method further comprises:
adding, removing, or replacing a terrain part of the deformed terrain according to an instruction input to the information processing apparatus, and
storing terrain part arrangement data based on the updating.

* * * * *